United States Patent
Rudolf et al.

(10) Patent No.: US 12,501,411 B2
(45) Date of Patent: Dec. 16, 2025

(54) UPLINK TRANSMISSION IN FULL-DUPLEX SYSTEMS

(71) Applicant: Samsung Electronics Co., Ltd., Suwon-si (KR)

(72) Inventors: Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/176,444

(22) Filed: Feb. 28, 2023

(65) Prior Publication Data

US 2023/0292294 A1  Sep. 14, 2023

Related U.S. Application Data

(60) Provisional application No. 63/319,584, filed on Mar. 14, 2022.

(51) Int. Cl.
*H04W 72/04* (2023.01)
*H04L 1/08* (2006.01)
(Continued)

(52) U.S. Cl.
CPC ............ *H04W 72/0446* (2013.01); *H04L 1/08* (2013.01); *H04L 5/14* (2013.01); *H04W 72/21* (2023.01); *H04W 72/232* (2023.01)

(58) Field of Classification Search
CPC ........... H04W 72/0448; H04W 72/232; H04W 72/21; H04L 5/14; H04L 1/08
See application file for complete search history.

(56) References Cited

U.S. PATENT DOCUMENTS

| 10,966,283 B2 * | 3/2021 | Xiong .................. H04L 5/0051 |
| 12,295,046 B2 * | 5/2025 | Ingale ............... H04W 74/0836 |

(Continued)

FOREIGN PATENT DOCUMENTS

| CN | 113163494 A | 7/2021 |
| EP | 3266264 B1 | 2/2021 |

OTHER PUBLICATIONS

International Search Report and Written Opinion issued Jun. 8, 2023 regarding International Application No. PCT/KR2023/003417, 7 pages.

(Continued)

*Primary Examiner* — Brenda H Pham

(57) ABSTRACT

Apparatuses and methods for uplink transmission in full-duplex systems. A method of operating a user equipment (UE) includes receiving first information for a first set of parameters of a physical uplink control channel (PUCCH) associated with a first subset of slots from a set of slots on a cell and second information for a second set of parameters of the PUCCH associated with a second subset of slots from the set of slots on the cell. The method further includes determining, based on whether a slot is from the first subset of slots or the second subset of slots, a set of PUCCH parameters from the first and second sets of parameters and transmitting, based on the set of PUCCH parameters, the PUCCH in the slot on the cell. Slots from the first subset of slots do not include time-domain resources indicated for simultaneous transmissions and receptions on the cell. Slots from the second subset of slots include time-domain resources indicated for simultaneous transmission and reception on the cell.

20 Claims, 11 Drawing Sheets

(51) Int. Cl.
    *H04L 5/14*     (2006.01)
    *H04W 72/0446*     (2023.01)
    *H04W 72/21*     (2023.01)
    *H04W 72/232*     (2023.01)

(56) References Cited

U.S. PATENT DOCUMENTS

| | | |
|---|---|---|
| 2017/0367138 A1 | 12/2017 | Lu et al. |
| 2020/0228196 A1 | 7/2020 | Wilson et al. |
| 2021/0320779 A1 | 10/2021 | Huang et al. |
| 2021/0345303 A1 | 11/2021 | Ying et al. |
| 2021/0392666 A1 | 12/2021 | Huang et al. |

OTHER PUBLICATIONS

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"5G; NR; NR and NG-RAN Overall description; Stage-2 (3GPP TS 38.300 version 16.8.0 Release 16)", ETSI TS 138 300 V16.8.0, Jan. 2022, 155 pages.

Extended European Search Report issued Apr. 22, 2025 regarding Application No. 23771069.4, 8 pages.

\* cited by examiner

UPLINK TRANSMISSION IN FULL-DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/319,584 filed on Mar. 14, 2022. The above-identified provisional patent application is hereby incorporated by reference in its entirety.

TECHNICAL FIELD

The present disclosure relates generally to wireless communication systems and, more specifically, to uplink transmission in full-duplex systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for supporting uplink transmission in full-duplex systems.

In one embodiment, a method of operating a user equipment (UE) is provided. The method includes receiving first information for a first set of parameters of a physical uplink control channel (PUCCH) associated with a first subset of slots from a set of slots on a cell and second information for a second set of parameters of the PUCCH associated with a second subset of slots from the set of slots on the cell. The method further includes determining, based on whether a slot is from the first subset of slots or the second subset of slots, a set of PUCCH parameters from the first and second sets of parameters and transmitting, based on the set of PUCCH parameters, the PUCCH in the slot on the cell. Slots from the first subset of slots do not include time-domain resources indicated for simultaneous transmissions and receptions on the cell. Slots from the second subset of slots include time-domain resources indicated for simultaneous transmission and reception on the cell.

In another embodiment, a user equipment (UE) is provided. The UE includes a transceiver configured to receive first information for a first set of parameters of a PUCCH associated with a first subset of slots from a set of slots on a cell and second information for a second set of parameters of the PUCCH associated with a second subset of slots from the set of slots on the cell. The UE includes a processor operably coupled to the transceiver, the processor configured to determine, based on whether a slot is from the first subset of slots or the second subset of slots, a set of PUCCH parameters from the first and second sets of parameters. The transceiver is further configured to transmit, based on the set of PUCCH parameters, the PUCCH in the slot on the cell. Slots from the first subset of slots do not include time-domain resources indicated for simultaneous transmissions and receptions on the cell. Slots from the second subset of slots include time-domain resources indicated for simultaneous transmission and reception on the cell.

In yet another embodiment, a base station (BS) is provided. The BS includes a transceiver configured to transmit first information for a first set of parameters of a PUCCH associated with a first subset of slots from a set of slots on a cell and second information for a second set of parameters of the PUCCH associated with a second subset of slots from the set of slots on the cell. A processor operably coupled to the transceiver, the processor configured to determine, based on whether a slot is from the first subset of slots or the second subset of slots, a set of PUCCH parameters from the first and second sets of parameters. The transceiver is further configured to receive, based on the set of PUCCH parameters, the PUCCH in the slot on the cell. Slots from the first subset of slots do not include time-domain resources indicated for simultaneous transmissions and receptions on the cell. Slots from the second subset of slots include time-domain resources indicated for simultaneous transmission and reception on the cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
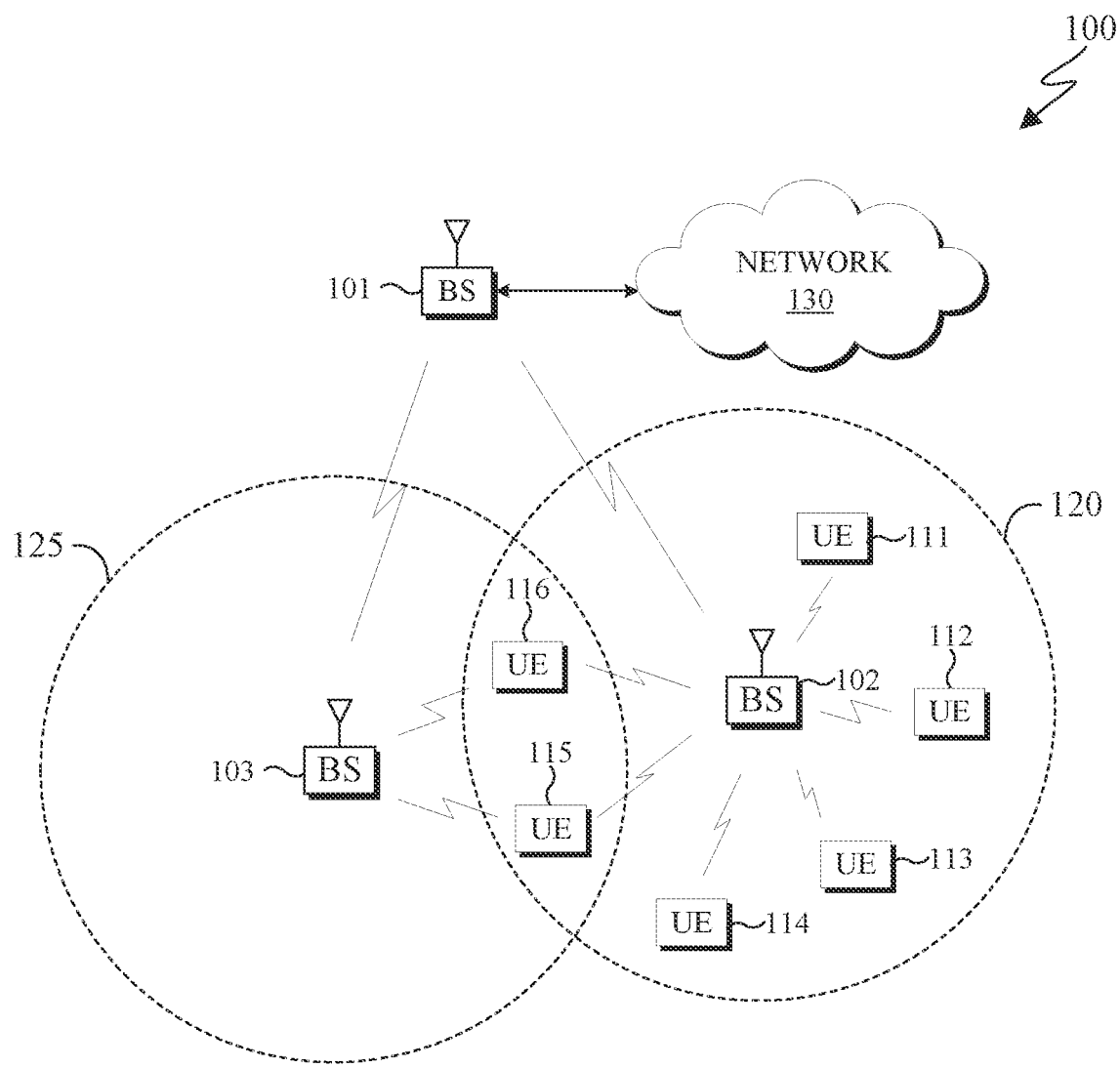
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical channels and modulation" (herein "REF 1"); 3GPP TS 38.212 v17.0.0, "NR, Multiplexing and Channel coding" (herein "REF 2"); 3GPP TS 38.213 v17.0.0, "NR, Physical Layer Procedures for Control" (herein "REF 3"); 3GPP TS 38.214 v17.0.0, "NR, Physical Layer Procedures for Data" (herein "REF 4); 3GPP TS 38.321 v16.5.0, "NR, Medium Access Control (MAC) protocol specification" (herein "REF 5"); 3GPP TS 38.331 v16.5.0, "NR, Radio Resource Control (RRC) Protocol Specification (herein "REF 6"), and 3GPP TS 38.133 v16.8.0, "NR; Requirements for support of radio resource management" (herein "REF 7").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
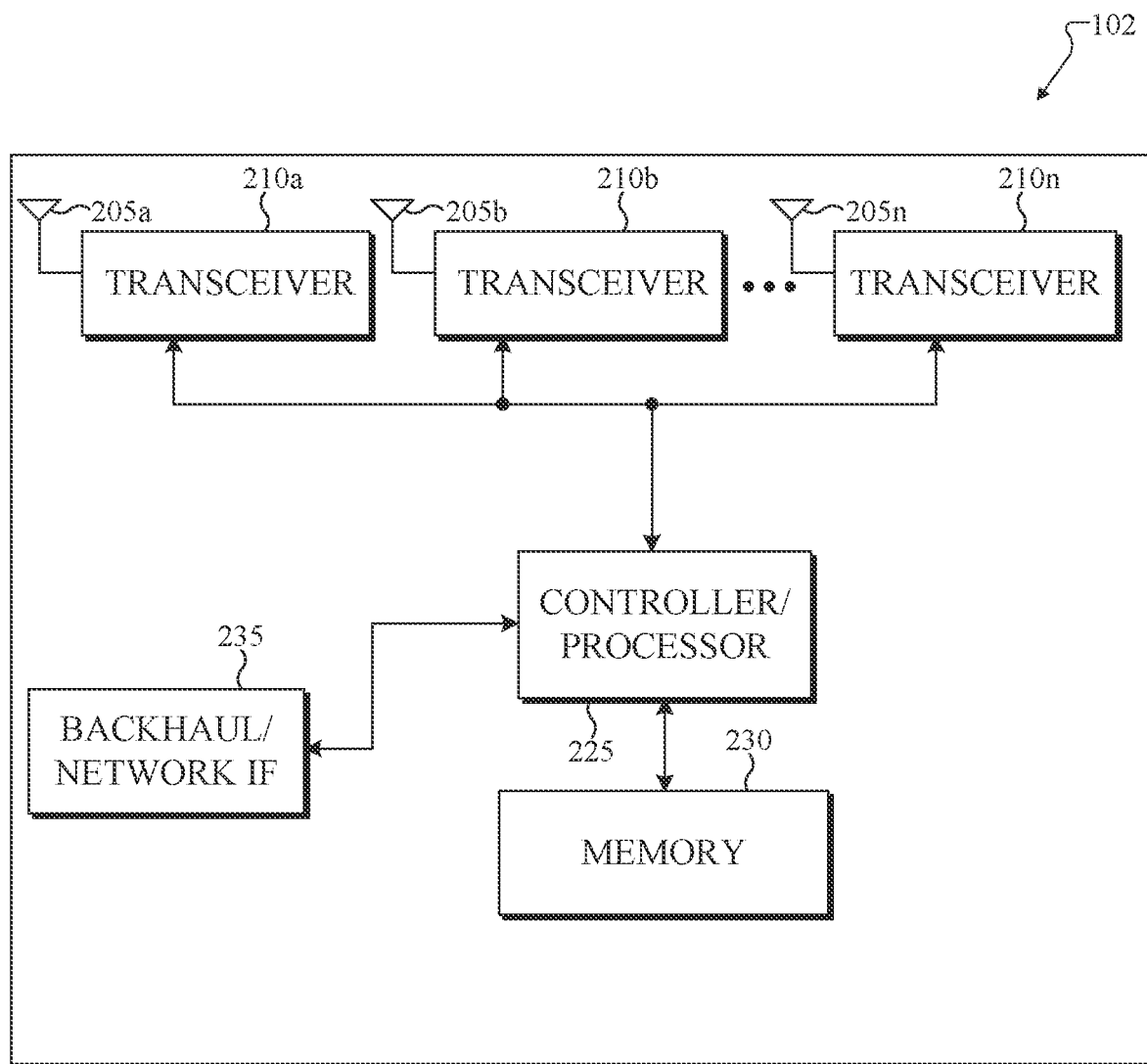
FIG. 2 illustrates an example gNB according to embodiments of the present disclosure.
Figure 3:
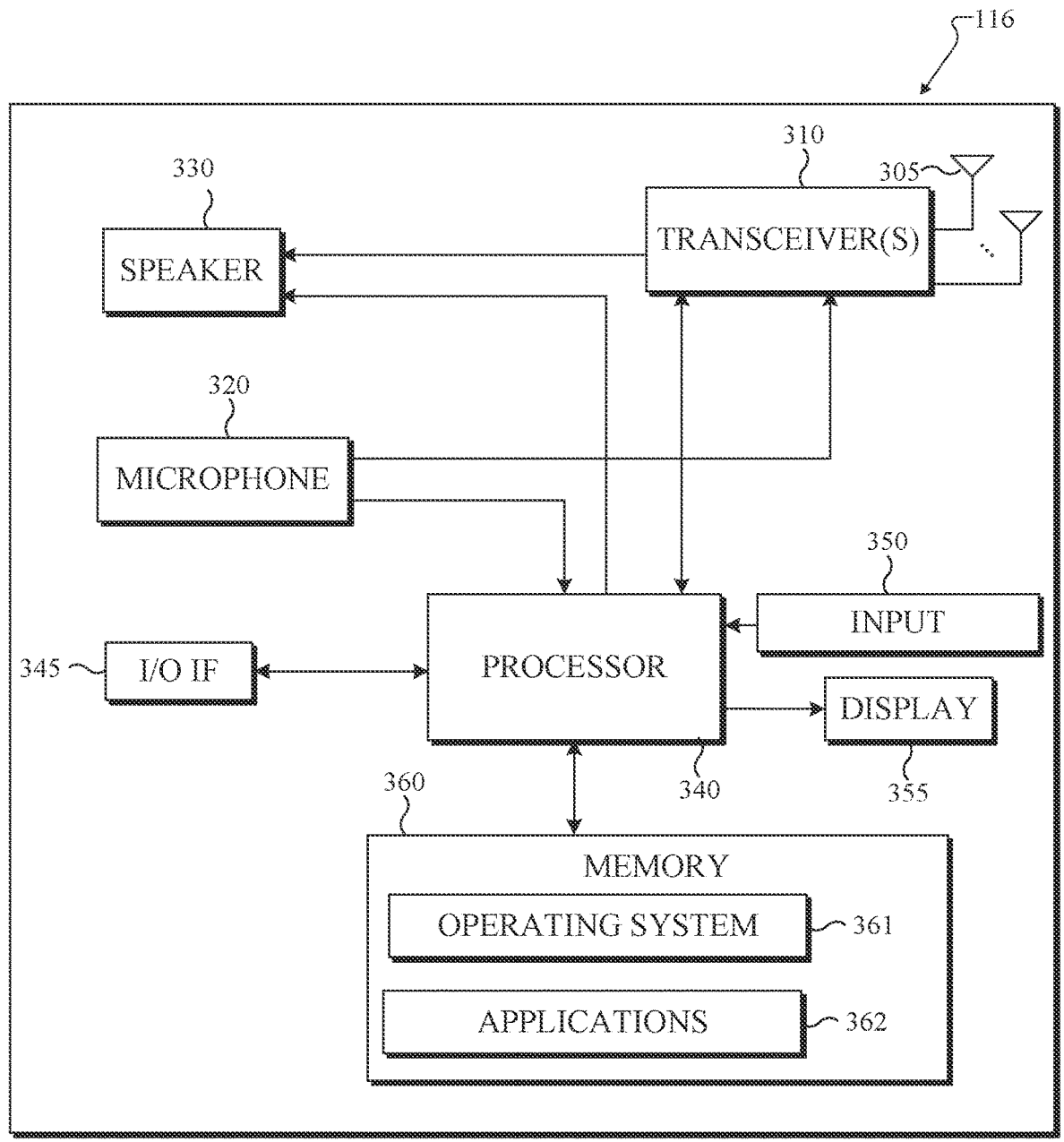
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting uplink transmission in full-duplex systems. In certain embodiments, one or more of the BSs 101-103 include circuitry, programing, or a combination thereof for supporting uplink transmission in full-duplex systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting uplink transmission in full-duplex systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting uplink transmission in full-duplex systems The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
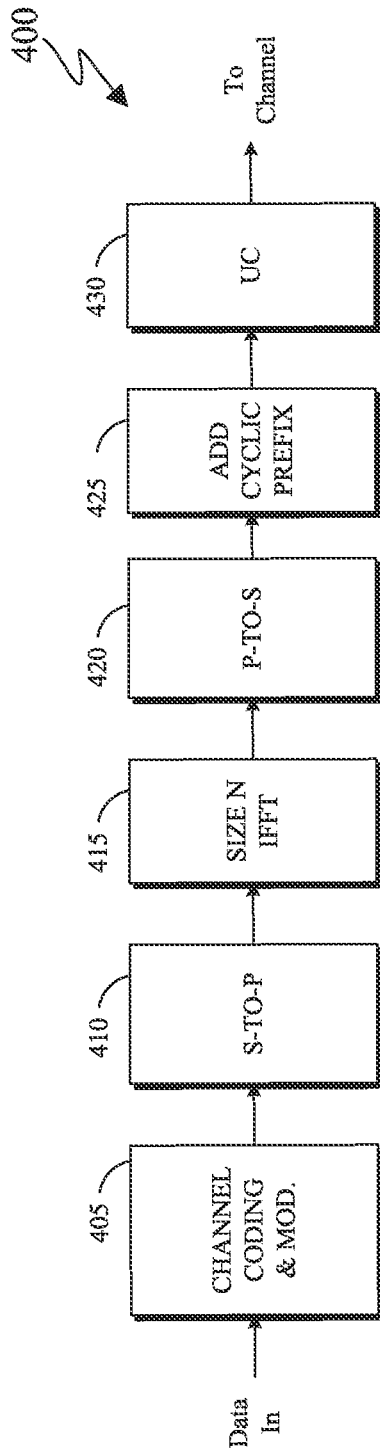
FIGS. 4 and 5 illustrate example wireless transmit and receive paths according to embodiments of the present disclosure.
Figure 5:
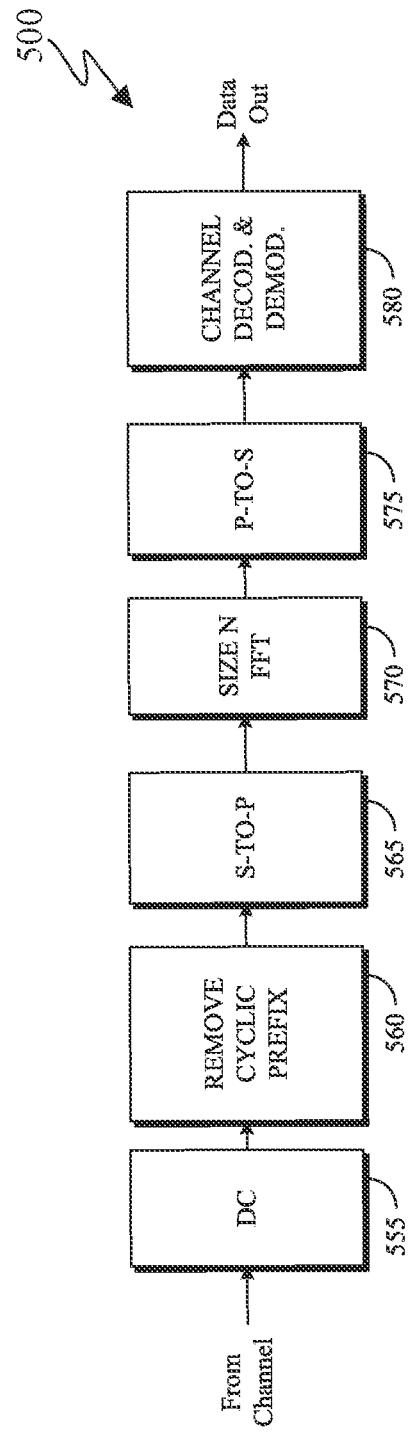

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support uplink transmission in full-duplex systems as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also NR specification). A UE transmits data information or UCI through a respective physical UL shared channel (PUSCH)

or a physical UL control channel (PUCCH). A PUSCH or a PUCCH can be transmitted over a variable number of slot symbols including one slot symbol. The gNB can configure the UE to transmit signals on a cell within an active UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SSBs transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

To improve the UL coverage, the Rel-15 NR UL supports the PUCCH repetition feature. The long PUCCH formats F1, F3 and F4 can be repeated over multiple slots. The number of PUCCH repetitions is configured by RRC. In Rel-15 NR, the UE is provided UE-specific PUCCH parameters using RRC PUCCH-Config per BWP. The IE includes parameter nrofSlots indicating to the UE the number of slots a PUCCH transmission must be repeated by the UE. RRC signaling can enable or disable the use of PUCCH repetition for a UE. When configured by RRC to use PUCCH repetition, the UE may skip a PUCCH transmission of the PUCCH repetition in a slot subject to certain conditions elaborated upon in the following.

Rel-16 NR introduces sub-slot based HARQ-ACK feedback to support more than one PUCCH for HARQ-ACK transmission within a slot, which is mainly beneficial for achieving low latency. An UL slot consists of a number of sub-slots. No more than one PUCCH carrying HARQ-ACKs starts in a sub-slot. A UE can indicate the supported sub-slot configuration among the candidate values of {7-symbol*2, 2-symbol*7 and 7-symbol*2} for normal CP or {6-symbol*2, 2-symbol*6 and 6-symbol*2} for extended CP. Rel-15 PUCCH repetition and Rel-16 NR sub-slot based HARQ-ACK feedback cannot be configured simultaneously for the UE. If a UE is provided an RRC PUCCH-config that includes subslotLengthForPUCCH, the UE does not expect the PUCCH configuration to include nrofSlots.

To improve the NR UL coverage for both FR1 and FR2 and for TDD and FDD, Rel-17 NR introduces several enhancements to PUSCH and PUCCH repetition. For PUSCH repetition Type A, the maximum number of repetitions is increased up to 32, applicable to both PUSCH transmission with and without dynamic grant. In addition, counting based on available slots is supported, the increased maximum number of repetitions for counting based on available slots and counting based on physical slots are both 32. TB processing over multi-slot (TBoMS) is supported for PUSCH transmission with and without dynamic grant. For a single transmission of TB processing over multi-slot PUSCH, the TB size is based on all the allocated REs across the multiple slots, and the number of slots is counted based on the available slots for UL transmission. In addition, repetition of TB processing over multi-slot PUSCH is also supported. DMRS bundling is supported for PUSCH repetition Type A scheduled by DCI format 0_1 or 0_2, for PUSCH repetition Type A with configured grant, for PUSCH repetition Type B, and for TB processing over multi-slot PUSCH and for PUCCH repetitions. Dynamic PUCCH repetition factor indication configured per PUCCH resource is introduced, applicable to all PUCCH formats. PUSCH repetition Type A for MSG3 transmission is supported on both normal UL carrier (NUL) and supplemental UL carrier (SUL), applicable to 4-step CBRA. If configured, the UE requests MSG3 repetition via separate PRACH resource when the RSRP of DL pathloss reference is lower than a configured threshold. In addition, repetition of CFRA PUSCH is also supported.

With reference to the Rel-17 NR enhancements for PUCCH repetition, in addition to dynamic indication of the PUCCH repetition by DCI and DM-RS bundling for PUCCH transmissions during PUCCH repetition, Rel-17 NR also introduces the possibility to use PUCCH repetition together with Rel-16 NR sub-slot based HARQ-ACK feedback and the possibility of switching between a first and a second set of provided spatial settings and/or power control parameters during PUCCH repetition.

DCI-based indication of PUCCH repetition in Rel-17 NR reuses the Rel-16 PUCCH resource indicator (PRI) field in the DL scheduling DCI formats. The PRI values map to a set of PUCCH resource indexes provided by RRC parameter resourceList for PUCCH resources from a set of PUCCH resources provided by parameter PUCCH-ResourceSet. Note that the principle of selection of a PUCCH resource set by the UE, e.g., as a function of the UCI payload size, remains unchanged. Rel-17 NR allows to configure a parameter PUCCH-nrofSlots per PUCCH resource. When the PRI field value in the DL scheduling DCI results in selection of a PUCCH resource for which Rel-17 parameter PUCCH-nrofSlots is configured, the PUCCH transmission is repeated. If both the Rel-17 parameter PUCCH-nrofSlots and the Rel-15 parameter nrofSlots are provided to the UE for a PUCCH resource, the Rel-17 parameter applies.

DM-RS bundling for PUCCH repetition, e.g., Rel-17 NR Joint Channel Estimation (JCE) allows to improve the UL coverage for PUCCH through gNB-side multi-slot channel estimation. To enable support for multi-slot channel estimation at the gNB, the UE maintains power consistency and phase continuity within a Time Domain Window (TDW) across its PUCCH transmissions of the PUCCH repetition. Certain listed types of conditions, e.g., events such as a gap between any two consecutive PUCCH transmissions exceeding 13 symbols or intermittent DL reception between any two PUCCH transmissions of PUCCH repetition cause power consistency and phase continuity not to be maintained across the PUCCH transmissions. The UE determines nominal and actual TDW(s). The UE is required to maintain power consistency and phase continuity within an actual Time Domain Window across PUCCH transmissions of PUCCH repetition. If an event causing power consistency and phase continuity not to be maintained occurs, the actual TDW ends in the last symbol of a PUCCH transmission before the event, e.g., possibly prior to the end of the determined nominal TDW. If RRC parameter PUCCH-Window-Restart is enabled, a new actual TDW providing power consistency and phase continuity for PUCCH transmissions of the remaining number of PUCCH repetitions may start in the first symbol of the PUCCH transmission after the event. More procedural aspects of DMRS bundling operation during PUCCH repetition are provided in the following.

With reference to the PUCCH repetition procedure, a UE can be indicated to transmit a PUCCH over $N_{PUCCH}^{repeat}$ slots using a PUCCH resource, where if the PUCCH resource is indicated by a DCI format and includes parameter PUCCH-nrofSlots, $N_{PUCCH}^{repeat}$ is provided by PUCCH-nrofSlots, otherwise, $N_{PUCCH}^{repeat}$ provided by parameter nrofSlots. If the UE is provided parameter subslotLengthForPUCCH, a slot for a PUCCH transmission with repetitions over $N_{PUCCH}^{repeat}>1$ slots includes a number of symbols indicated by subslotLengthForPUCCH.

For $N_{PUCCH}^{repeat}>1$, the UE repeats the PUCCH transmission with the UCI over $N_{PUCCH}^{repeat}$ slots. A PUCCH transmission in each of the $N_{PUCCH}^{repeat}$ slots has a same number of consecutive symbols, as provided by nrofSymbols. A PUCCH transmission in each of the $N_{PUCCH}^{repeat}$ slots has a same first symbol, as provided by parameter startingSymbolIndex if subslotLengthForPUCCH is not provided; otherwise mod(startingSymbolIndex, subslotLengthForPUCCH). The UE is configured by parameter interslotFrequencyHopping whether or not to perform frequency hopping for PUCCH transmissions in different slots. If the UE is configured to perform frequency hopping for PUCCH transmissions across different slots, the UE performs frequency hopping per slot, the UE transmits the PUCCH starting from a first PRB, provided by parameter startingPRB, in slots with even number and starting from the second PRB, provided by parameter secondHopPRB, in slots with odd number. The slot indicated to the UE for the first PUCCH transmission has number 0 and each subsequent slot until the UE transmits the PUCCH in $N_{PUCCH}^{repeat}$ slots is counted regardless of whether or not the UE transmits the PUCCH in the slot. The UE does not expect to be configured to perform frequency hopping for a PUCCH transmission within a slot. If the UE is not configured to perform frequency hopping for PUCCH transmissions across different slots and if the UE is configured to perform frequency hopping for a PUCCH transmission within a slot, the frequency hopping pattern between the first PRB and the second PRB is same within each slot.

If the UE determines that, for a PUCCH transmission in a slot, the number of symbols available for the PUCCH transmission is smaller than the value provided by nrofSymbols for the corresponding PUCCH format, the UE does not transmit the PUCCH in the slot.

A SS/PBCH block symbol is a symbol of an SS/PBCH block with candidate SS/PBCH block index corresponding to the SS/PBCH block index indicated to a UE by parameter ssb-PositionsInBurst in SIB1 or ssb-PositionsInBurst in RRC ServingCellConfigCommon, as described in REF3.

For unpaired spectrum, the UE determines the $N_{PUCCH}^{repeat}$ slots for a PUCCH transmission starting from a slot indicated to the UE for HARQ-ACK reporting, or a slot determined for SR reporting as described in REF3 or a slot for CSI reporting as described in REF4 and having an UL symbol or flexible symbol that is not SS/PBCH block symbol provided by startingSymbolIndex as a first symbol, and consecutive UL symbols or flexible symbols that are not SS/PBCH block symbols, starting from the first symbol, equal to or larger than a number of symbols provided by nrofSymbols as described in REF3.

For paired spectrum or supplementary uplink band, the UE determines the $N_{PUCCH}^{repeat}$ slots for a PUCCH transmission as the $N_{PUCCH}^{repeat}$ consecutive slots starting from a slot indicated to the UE for HARQ-ACK reporting, or a slot determined for SR reporting as described in REF3 or a slot for CSI reporting as described in REF4.

If a UE would transmit a PUCCH over a first number $N_{PUCCH}^{repeat}>1$ of slots and the UE would transmit a PUSCH with repetition Type A over a second number of slots, and the PUCCH transmission would overlap with the PUSCH transmission in one or more slots, and the conditions for multiplexing the UCI in the PUSCH as described in RFE3 are satisfied in the overlapping slots, the UE transmits the PUCCH and does not transmit the PUSCH in the overlapping slots. If a UE would transmit a PUCCH over a first number $N_{PUCCH}^{repeat}>1$ of slots and the UE would transmit a PUSCH with repetition Type B over a second number of slots, and the PUCCH transmission would overlap with actual PUSCH repetitions in one or more slots, and the conditions for multiplexing the UCI in the PUSCH as described in REF3 are satisfied for the overlapping actual PUSCH repetitions, the UE transmits the PUCCH and does not transmit the overlapping actual PUSCH repetitions.

A UE does not multiplex different UCI types in a PUCCH transmission with repetitions over $N_{PUCCH}^{repeat}>1$ slots. If a UE would transmit a first PUCCH over more than one slot and at least a second PUCCH over one or more slots, and the transmissions of the first PUCCH and the second PUCCH would overlap in a number of slots then, for each slot of the number of slots and with UCI type priority of HARQ-ACK>SR>CSI with higher priority>CSI with lower priority. The UE does not expect the first PUCCH and any of the second PUCCHs to start at a same slot and include a UCI type with same priority. If the first PUCCH and any of the second PUCCHs include a UCI type with same priority, the UE transmits the PUCCH starting at an earlier slot and does not transmit the PUCCH starting at a later slot. If the first PUCCH and any of the second PUCCHs do not include a UCI type with same priority, the UE transmits the PUCCH that includes the UCI type with higher priority and does not transmit the PUCCH that include the UCI type with lower priority.

When a PUCCH resource used for repetitions of a PUCCH transmission by a UE includes first and second spatial settings, or first and second sets of power control parameters, as described in REF5 and REF3, the UE uses the first and second spatial settings, or the first and second sets of power control parameters, for first and second repetitions of the PUCCH transmission, respectively, when $N_{PUCCH}^{repeat}=2$, alternates between the first and second spatial settings, or between the first and second sets of power control parameters, respectively, per $N_{PUCCH}^{switch}$ repetitions of the PUCCH transmission, where $N_{PUCCH}^{switch}=1$ if parameter mappingPattern='cyclicMapping'; else, $N_{PUCCH}^{switch}=2$.

A UE does not expect a PUCCH that is in response to a DCI format detection to overlap with any other PUCCH that does not satisfy the corresponding timing conditions described in REF3.

If a UE would transmit a PUCCH over $N_{PUCCH}^{repeat}$ slots and the UE does not transmit the PUCCH in a slot from the $N_{PUCCH}^{repeat}$ slots due to overlapping with another PUCCH transmission in the slot, the UE counts the slot in the number of $N_{PUCCH}^{repeat}$ slots.

For DAPS operation, if a UE would transmit a PUCCH over $N_{PUCCH}^{repeat}$ slots on the source MCG and the UE does not transmit the PUCCH in a slot from the $N_{PUCCH}^{repeat}$ slots due to overlapping in time with UE transmission on the target MCG in the slot, the UE counts the slot in the number of $N_{PUCCH}^{repeat}$ slots.

With reference Joint Channel Estimation procedures, for PUCCH transmissions of PUCCH repetition, the Rel-17 DM-RS bundling for PUCCH can be enabled by the parameter PUCCH-DMRS-Bundling (per UL BWP). Note that DM-RS bundling for PUCCH is not supported for PUCCH format 0/2. When the RRC provided parameter PUCCH-DMRS-Bundling is enabled for the UE the UE determines one or multiple nominal TDW(s) as follows. For PUCCH transmissions of PUCCH repetition the duration of each nominal TDW except the last nominal TDW in number of consecutive slots is given by RRC parameter PUCCH-TimeDomainWindowLength (with a range of 2-8) if configured. Alternatively, the duration is computed as min ([maxDMRS-BundlingDuration], M) when PUCCH-TimeDomainWindowLength is not configured, where M is the time duration in consecutive slots from the first slot determined for PUCCH transmissions of PUCCH repetition to the last slot determined for PUCCH transmissions of PUCCH repetition as described in REF3.

For PUCCH transmissions of a PUCCH repetition, the start of the first nominal TDW is the first slot determined for the first PUCCH transmission. The end of the last nominal TDW is the last slot determined for the last PUCCH transmission. The start of any other nominal TDW(s) is the first slot determined for PUCCH transmission after the last slot determined for PUCCH transmission of a previous nominal TDW.

For PUCCH transmissions of PUCCH repetition, a nominal TDW consists of one or multiple actual TDWs. The UE determines the actual TDWs as follows. The start of the first actual TDW is the first symbol of the first PUCCH transmission in a slot determined for PUCCH transmission within the nominal TDW. The end of an actual TDW is the last symbol of the last PUCCH transmission in a slot determined for transmission of the PUCCH within the nominal TDW, if the actual TDW reaches the end of the last PUCCH transmission within the nominal TDW, the last symbol of a PUCCH transmission before the event, if an event occurs which causes power consistency and phase continuity not be maintained across PUCCH transmissions of PUCCH repetition within the nominal TDW, and the PUCCH transmission is in a slot determined for transmission of the PUCCH, or when parameter PUCCH-Window-Restart is enabled, the start of a new actual TDW is the first symbol of the PUCCH transmission after the event which causes power consistency and phase continuity not to be maintained across PUCCH transmissions of PUCCH repetition within the nominal TDW, and the PUCCH transmission is in a slot determined for transmission of the PUCCH.

Events which cause power consistency and phase continuity not to be maintained across PUCCH transmissions of PUCCH repetition within the nominal TDW are:
- A DL slot or DL reception or DL monitoring based on tdd-UL-DL-ConfigurationCommon and tdd-UL-DL-ConfigurationDedicated for unpaired spectrum,
- The gap between any two consecutive PUCCH transmissions exceeds 13 symbols,
- The gap between any two consecutive PUCCH transmissions does not exceed 13 symbols but other UL transmissions are scheduled between the two consecutive PUCCH transmissions,
- For PUCCH transmissions of PUCCH repetition, a dropping or cancellation of a PUCCH transmission according to REF3,
- For any two consecutive PUCCH transmissions of PUCCH repetition, and when a PUCCH resource used for repetitions of a PUCCH transmission by a UE includes first and second spatial relations, different spatial relations are used for the two PUCCH transmissions of PUCCH repetition, according to REF3,
- UL timing adjustment in response to a timing advance command according to REF3,
- Frequency hopping.

The UE maintains power consistency and phase continuity within an actual TDW across PUCCH transmissions of PUCCH repetition in case the actual TDW is created in response to frequency hopping or in response to any event not triggered by DCI or MAC-CE. The UE maintains power consistency and phase continuity within an actual TDW across PUCCH transmissions of PUCCH repetition in case the actual TDW is created in response to an event triggered by DCI other than frequency hopping or by MAC-CE, subject to UE capability. Note that PUCCH repetitions with different sets of power control parameters in multi-TRP operation are regarded as a semi-static event that causes power consistency and phase continuity not to be maintained across PUCCH repetitions.

When PUCCH repetitions are configured with DM-RS bundling, a higher layer parameter PUCCH-FrequencyHopping-Interval may be provided to the UE. For inter-slot frequency hopping and DMRS bundling with PUCCH repetitions in Rel-17 NR, the UE performs the determination of frequency hopping intervals, then the determination of the configured TDW, and then the determination of the actual TDW in the sequential order shown. DM-RS bundling is restarted by the UE at the beginning of each frequency hop and DM-RS bundling is per actual TDW. The relative slot index may be used to determine inter-slot frequency hopping for PUCCH repetitions with DMRS bundling. The RRC configuration(s) provided to the UE for hopping interval determination and configured TDW determination are separate. If the hopping interval is not configured, the default hopping interval is the same as the configured TDW length. Note that the UE determines the Rel-17 frequency hopping interval for PUCCH repetition with DM-RS bundling only when the hopping interval is configured.

Figure 6:
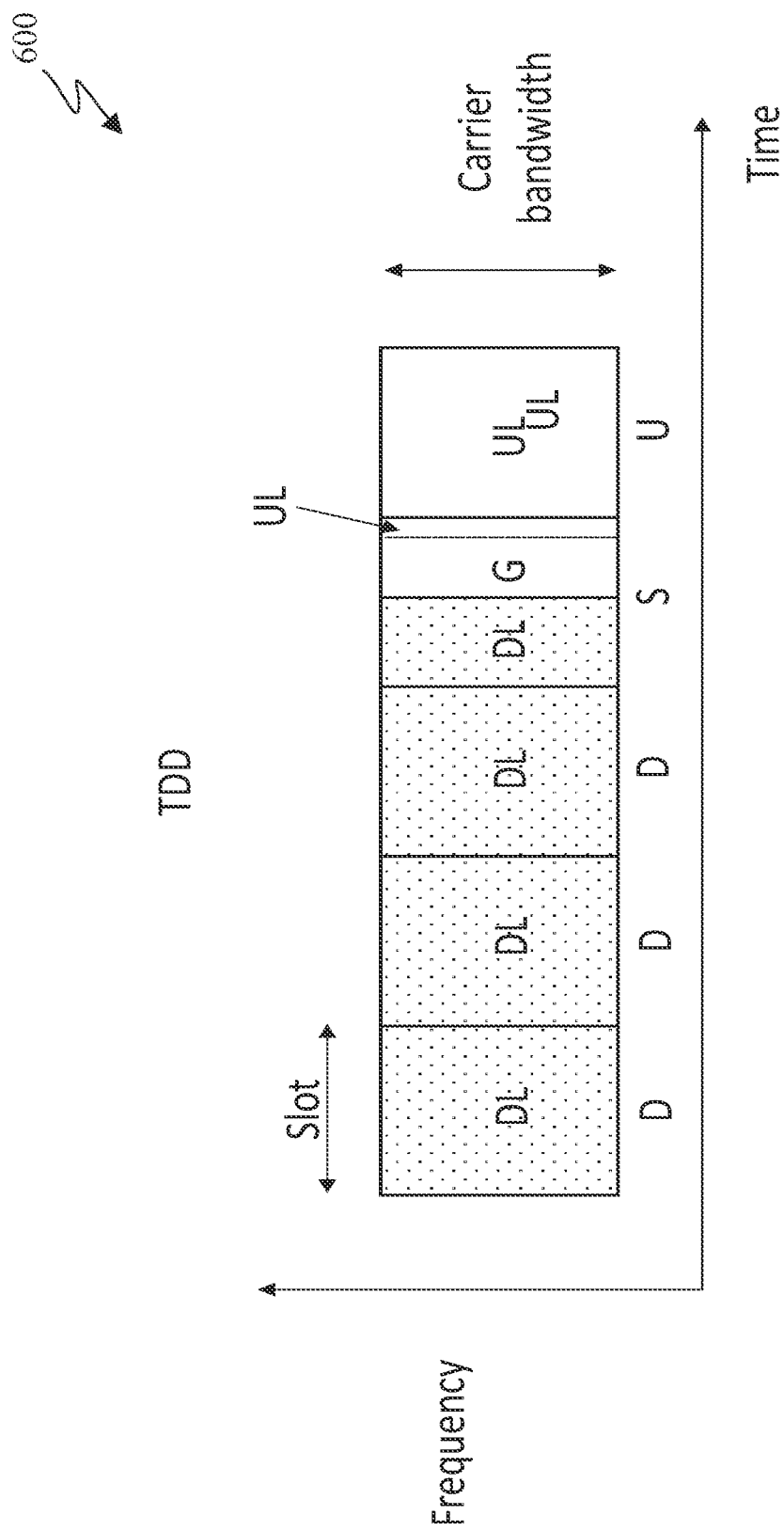
FIG. 6 illustrates an example UL-DL frame configuration in a TDD communications system according to embodiments of the disclosure.

FIG. 6 illustrates an example UL-DL frame configuration in a TDD communications system 600 according to embodiments of the disclosure. The embodiment of the UL-DL frame configuration in a TDD communications system 600 illustrated in FIG. 6 is for illustration only. FIG. 6 does not limit the scope of this disclosure to any particular implementation of the UL-DL frame configuration in a TDD communications system 600.

5G NR radio supports time-division duplex (TDD) operation and frequency division duplex (FDD) operation. Use of FDD or TDD depends on the NR frequency band and per-country allocations. TDD is required in most bands above 2.5 GHz. FIG. 6 illustrates an example structure of slots or single-carrier TDD UL-DL frame configuration for a TDD communications system according to the embodiments of the disclosure.

A DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has several advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there are many antennas or antenna elements.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions to improve coverage (an alternative in such case is for a network to forgo HARQ-ACK information at least for some transport blocks in the DL).

To address some of the disadvantages for TDD operation, a dynamic adaptation of link direction has been considered where except for some symbols in some slots supporting predetermined transmissions such as for SSBs, symbols of a slot can have flexible transmission direction, e.g., DL or UL, which a UE can determine according to scheduling information for transmissions or receptions. A PDCCH can also be used to provide a DCI format, such as a DCI format 2_0 as described in REF2 and REF3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be allocated in the center of a carrier, or at the edge of the carrier, or at a selected frequency-domain position of the carrier. The allocations of DL sub-bands and UL sub-bands may partially or fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

When a UE receives signals/channels from a gNB on a full-duplex slot or symbol, the receptions may be scheduled in a DL subband of the full-duplex slot or symbol. When full-duplex operation at the gNB uses a DL slot or symbol for scheduling transmissions from the UE using full-duplex transmission and reception at the gNB, there may be one or multiple, such as two, DL subbands on the full-duplex slot or symbol. When a UE is scheduled to transmit on a full-duplex slot or symbol, the transmission may be scheduled in an UL subband of the full-duplex slot or symbol. When full-duplex operation at the gNB uses an UL slot or symbol for purpose of scheduling transmissions to UEs using full-duplex transmission and reception at the gNB, there may be one or multiple, such as two, UL subbands in the full-duplex slot or symbol. Full-duplex operation using an UL subband or a DL subband may be referred to as Subband-Full-Duplex (SBFD).

In the following, for brevity, full-duplex slots/symbols and SBFD slots/symbols may be jointly referred to as SBFD slots/symbol and non-full-duplex slots/symbols and normal DL or UL slot/symbols may be referred to as non-SBFD slots/symbols.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit and receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the present disclosure, Full-Duplex (FD) is used as a short form for a full-duplex operation in a wireless system. The terms "Cross-Division-Duplex (XDD)" and FD or SBFD can be used interchangeably used in the disclosure.

FD operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDDSUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 7:
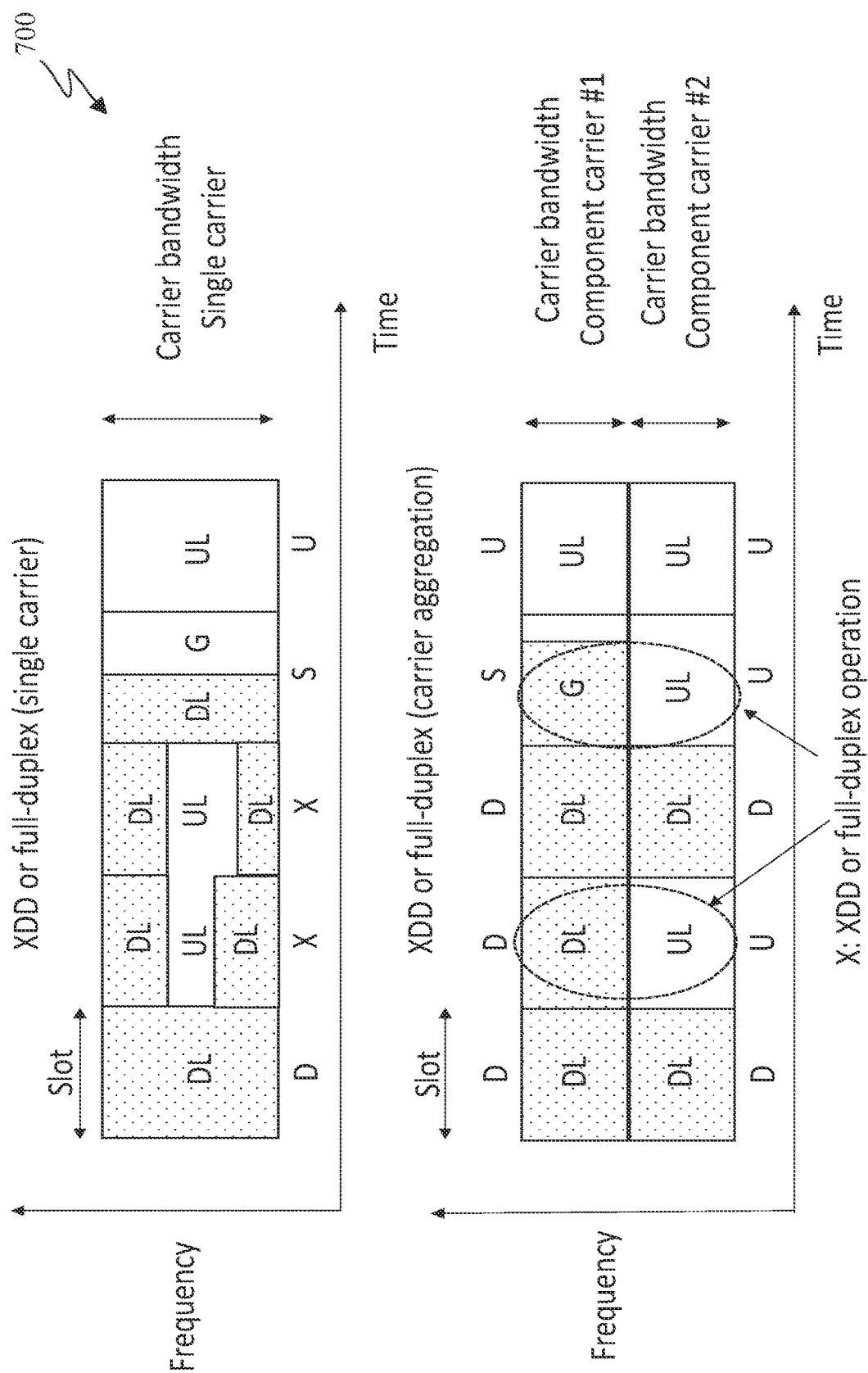
FIG. 7 illustrates example UL-DL frame configurations in a full-duplex communications system according to embodiments of the disclosure.

FIG. 7 illustrates example UL-DL frame configurations in a full-duplex communications system 700 according to embodiments of the disclosure. The embodiment of the UL-DL frame configurations in a full-duplex communications system 700 illustrated in FIG. 7 is for illustration only. FIG. 7 does not limit the scope of this disclosure to any particular implementation of the UL-DL frame configuration in a TDD communications system 700.

FIG. 7 illustrates two example full-duplex configurations using single- and multi-carrier UL-DL frame configurations according to embodiments of the disclosure For a single carrier TDD configuration with full-duplex enabled, slots denoted as X are full-duplex or XDD slots. Both DL and UL transmissions can be scheduled in FD slots for at least one or more symbols. The term FD slot is used to refer to a slot where UEs can simultaneously both receive and transmit in at least one or more symbols of the slot if scheduled or assigned radio resources by the base station. A half-duplex UE cannot both transmit and receive simultaneously in an FD slot or on a symbol(s) of an FD slot. When a half-duplex UE is configured for transmission in symbols of an FD slot, another UE can be configured for reception in the symbols of the FD slot. A full-duplex UE can transmit and receive simultaneously in symbols of an FD slot, possibly in presence of other UEs scheduled or assigned resources for either DL or UL in the symbols of the FD slot. Transmissions by a UE in a first FD slot can use same or different frequency-domain resources than in a second FD slot, wherein the resources can differ in bandwidth, a first RB, or a location of the center carrier.

For a carrier aggregation TDD configuration with FD enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex or SBFD operation. UL transmissions can also occur in a last slot (U) where the full UL transmission bandwidth is available. FD or SBFD slots or symbol assignments over a period of time and/or a number of slots or symbols can be indicated by a DCI format in a PDCCH reception and can then vary per unit of the time period, or can be indicated by higher layer signaling, such as via a MAC CE or RRC.

Various embodiments of the present disclosure recognize issues when considering UL transmissions in a full-duplex capable wireless communication system. Accordingly, various embodiments of the present disclosure provide mechanisms for supporting UL transmissions using the PUCCH repetition feature in a wireless communication system supporting full-duplex operation.

The example of the single-carrier full-duplex configuration DXXSU as shown in FIG. 7 is considered in a TDD cell with support for gNB full-duplex operation. The slots are numbered from #1 to #5. For legacy Rel-15 UEs, the gNB configures a common UL-DL frame configuration through SIB1 in this serving cell. No UE-dedicated, e.g., UE-specific RRC UL-DL frame configuration is provided to the UEs by the gNB. SFI, e.g., DCI F2_0 is not configured. Note that this example corresponds to a typical TDD configuration in Rel-15 NR where FG 5-1 is mandatory to support for the UE, but FG 5-1a (UE-specific RRC UL DL frame configuration) and FG 3-6 (SFI) are optional UE features. Without loss of generality, this example assumes NR operation in n78 (3.5 GHz) and SCS=30 kHz. For simplicity, it is assumed that the UE DL and UL BWPs are configured over the full NR channel BW, e.g., 100 MHz. Any aspects related to guard RBs, transmission power, beamforming, or processing and timing requirements related to PUSCH transmissions in the serving cell using full-duplex transmissions and receptions are ignored.

The gNB can configure the SIB1 TDD-UL-DL-Config-Common with {dl-UL-TransmissionPeriodicity, nrofDownlinkSlots, nrofDownlinkSymbols, nrofUplinkSlots, nrofUplinkSymbols}={P=2.5 ms, 3 DL slots, 12 DL sym, 0 UL sym, 1 UL slot} or DDDS(D)U. Legacy NR UEs therefore consider only the last 2 symbols in slot #4 as flexible symbols (F). This effectively disables the possibility to schedule any UL transmissions for the legacy UEs using the SBFD UL subband in the full-duplex slots #2 and #3.

When legacy UEs are configured with the Rel-15 NR PUCCH repetition feature over K={2, 4 or 8} slots and L=14 symbols for a PUCCH transmission in a slot. No PUCCH transmission in a DL slot can occur as determined by the PUCCH transmission procedure in REF3. Similarly, no PUCCH transmission on the flexible symbols in slot #4 can occur because L>2. The PUCCH of a PUCCH repetition is therefore transmitted by the UE only in the UL slot #5.

When the gNB configures SIB1 TDD-UL-DL-Config-Common with {P=2.5 ms, 1 DL slot, 0 DL sym, 0 UL sym, 1 UL slot} or DFFFU, UL transmissions with Rel-15 PUCCH repetition can be scheduled by the gNB using the SBFD UL subband in full-duplex slots #2 and #3 (assuming no SSB is configured by the gNB in these slots).

For the repeated PUCCH transmissions using the SBFD UL subband of full-duplex slots #2 and #3 and in the normal UL slot #5, the same UL BWP configuration and the same PUCCH frequency-domain allocation must then be used. The same PUCCH frequency-hopping behavior must apply. For example, depending on the slot indicated to the UE for the first PUCCH transmission, the UE then determines the PRB index of the PUCCH transmission in the first hop provided by startingPRB in slots with even number, but provided by secondHopPRB to determine the PRB index of the PUCCH transmission in slots with odd number. If the first PUCCH transmission occurs in the full-duplex slot #3, the UE would transmit the PUCCH of a PUCCH repetition using secondHopPRB in UL slot #4. If the first PUCCH transmission occurs in the full-duplex slot #2, the UE would transmit the PUCCH of a PUCCH repetition using startingPRB in UL slot #4. For example, the configured startingPRB and secondHopPRB must be chosen by the gNB for the UE such that the PUCCH allocation computed by the UE as by REF3 using these two and the additionally provided parameters such as the PRB offset $RB_{BWP}^{offset}$ does not map outside the SBFD UL subband in the full-duplex slots #2 and #3.

When the UE is configured with Rel-17 NR PUCCH repetition feature, the number of repetitions can be indicated by DCI by means of an index into the RRC-configured number of repetitions. The possible signaled PRI values indicated by the DCI map to a set of PUCCH resource indexes provided by RRC parameter resourceList for PUCCH resources from a set of PUCCH resources provided by parameter PUCCH-ResourceSet. The same considerations as described above for the case of Rel-15 NR PUCCH repetition apply.

One issue relates to PUCCH transmissions of a PUCCH repetition. When PUCCH repetition is configured in a TDD serving cell with full-duplex support, PUCCH repetitions can only occur using either the normal UL slots only, or both the full-duplex slots and normal UL slots together. It is not possible to configure PUCCH repetition using only and exclusively the full-duplex slots except for a small number of limited cases such as K=2 when 2 consecutive full-duplex slots provided. Note that in even in the case when a UE is provided with the configuration(s) of an SBFD UL subband, e.g., slots/symbols and start/end RBs, existing state-of-the-art allows for PUCCH repetition to be scheduled only using UL or F slots/symbols, so PUCCH repetition must still occur using either the normal UL slots alone or must use both the full duplex slots and the normal UL slots together. The PUCCH frequency-domain allocation and/or frequency-hopping behavior must also be the same for the PUCCH transmissions corresponding to a PUCCH repetition across the full-duplex and the normal UL slots. The SBFD UL subband is usually placed at the center of the operator's channel BW to protect the first adjacent TDD channels from cross-link interference (CLI). The PUCCH transmission corresponding to PUCCH repetition using an SBFD UL subband in the full-duplex slots must be allocated to the middle of the channel BW. Therefore, the PUCCH transmission of the PUCCH repetition comprising a full-duplex slot must then also occur in the middle of the channel BW of the normal UL slot.

In consequence, the schedulable UL BW in the normal UL slot becomes partitioned when PUCCH repetitions using the full-duplex slots results in a PUCCH transmission corresponding to the PUCCH repetition in the normal UL slot. PUSCH transmissions in the normal UL slot cannot be allocated a large contiguous BW anymore which dramatically decreases the achievable UL cell throughput and the UL spectral efficiency. Rel-15 NR UEs are only mandated to support UL resource allocation type 1 with (almost) frequency-contiguous PUSCH allocations. Therefore, a PUSCH frequency allocation for the UEs in good link conditions can only be located either completely below or completely above the center BW occupied by the PUCCH transmission of PUCCH repetitions using a full-duplex slot from UEs in bad link conditions. When the SBFD UL subband comprises around 20% of the channel BW, UEs with good SINR can then be scheduled not more than 40% of the UL scheduling BW in the normal UL slot. Note that the need to schedule PUCCH repetitions in the middle of the channel BW corresponding to the SBFD UL subband arises purely because the PUCCH repetition resulting in the use of both full-duplex slots and the normal UL slots together can't be avoided using existing state-of-the-art. When PUCCH repetition in the serving cell is deliberately configured to use only a small and limited repetition factor of K=2 instead of K up to 8 to avoid above shortcoming, this greatly reduces the achievable UL radio range for PUCCH transmissions from UEs in bad link conditions. The (theoretical) use of UL resource allocation type 0 using RBG-based allocations for PUSCH transmission in the UL slot would result in increased UE complexity. Worse, the need for control of resulting spectral emissions results in additional UL power back-off's of up to several dBs applied by the UE to the corresponding PUSCH transmissions which again greatly reduces the achievable UL radio range for a given UL data rate for the UEs in good link conditions. This is because these UE cannot use their maximum UL transmission power anymore. The full and unpartitioned schedulable UL BW in the normal UL slot for UEs in good link conditions is then only available to the gNB when there is no DL scheduling to the UE in bad link condition (which would result in UCI of type Ack/Nack using the PUCCH repetitions) or when UCI of type CSI is not configured for transmissions from such UEs.

Various embodiments of the present disclosure provide methods using common or UE-specific RRC signaling and DCI-based indication to control the UE time-domain transmission behavior of PUCCH transmissions in a PUCCH repetition, methods for indication and determination of separate PUCCH configurations in SBFD or non-SBFD slots/symbols, methods for available slot counting and determination of candidate slots for PUCCH repetition by the UE, methods using one or multiple lists or sequences for PUCCH resource allocation in the PUCCH repetition to control the UE time-domain transmission behavior of PUCCH repetition.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity and conciseness of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common TDD UL-DL frame configuration of a serving cell by receiving a system information block (SIB) such as a SIB1 when accessing the cell from RRC IDLE or by common RRC signaling when the UE is configured with Scell(s) or additional SCG(s) by an IE ServingCellConfigCommon in RRC CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity and conciseness of description, SFI refers to a slot format indicator as example which is configured using higher layer provided IEs such as slotFormatCombination or slotFormatCombinationsPerCell and which is indicated to the UE by group common DCI such as DCI F2_0 where slotFormats are defined in REF3.

In the following, for brevity and conciseness of description, the term xdd-config is used to describe the configuration and parameterization for UE determination of DL receptions and/or UL transmissions in a serving cell supporting full-duplex operation. Note that it is not necessary that the use of full-duplex operation by the gNB in the serving cell when scheduling DL receptions and/or UL transmissions in a slot or symbol is identifiable by or known to the UE. For example, parameters associated with the xdd-config may include a set of time-domain resources, e.g., symbol(s)/slot(s), in which DL receptions or UL transmissions are allowed, possible or disallowed; a range or a set of frequency-domain resources, e.g., serving cell(s), BWP(s), start and/or end or a set of RBs, in which DL receptions or UL transmissions are allowed, possible or disallowed; one or multiple guard intervals for time- and/or frequency domain radio resources during DL receptions or UL transmissions, e.g., guard SCs or RBs, guard symbols; one or multiple resource type(s), e.g., 'simultaneous Tx-Rx', 'Rx only', or 'Tx only' or 'D', 'U', 'F', 'N/A'; one or multiple scheduling behaviors, e.g., "DG only", "CG only", "any". Parameters associated with the xdd-config may include indication(s) or value(s) to determine the (assumed) Tx power settings of DL receptions by the UE, e.g., reference power, EPRE, or power offset of a designated DL channel/or signal type; to determine the UL transmission power and/or spatial settings by the UE. Configuration and/or parameters associated with the xdd-config may be provided to the UE using higher layer signaling, DCI-based signaling and/or MAC CE based signaling. For example, parameters associated with xdd-config may be provided to the UE by means of common RRC signaling using SIB. In another example, parameters associated with xdd-config may be provided to the UE by means of dedicated RRC signaling such as ServingCellConfig. For example, parameters associated with xdd-config may be provided using an RRC-configured TDRA table or using a PUCCH configuration and/or DCI-based signaling indicates to the UE which configuration should be applied.

Various embodiments of the present disclosure provide the UE with separate PUCCH configurations associated with SBFD and non-SBFD slots/symbols, respectively, to indicate UE specific or of cell specific PUCCH parameters in a BWP or in a carrier for a cell group of carriers. Separate PUCCH configurations associated with SBFD and non-SBFD slots/symbols, respectively, may be provided to the UE to configure or to indicate separate PUCCH format configurations, or separate PUCCH resources or PUCCH resources sets for SBFD and non-SBFD slots/symbols, respectively. Separate values for a same parameter in a PUCCH configuration, in a PUCCH resource or resource set, or in PUCCH format may be provided as information to the UE where a first value of the parameter is indicated for use by the UE in a non-SBFD slots/symbols and a second value of the parameter then is indicated for use by the UE in an SBFD slot/symbol. For example, a parameter may correspond to a configured or an indicated PUCCH resource or a PUCCH format, a DL data to UL Acknowledgment (ACK) timing or delay, a number of repetitions, a DMRS bundling indication, a number of bits configured for PUCCH resource indication (PRI) in a DCI, a cyclic or sequential mapping pattern for PUCCH repetition associated with spatial settings or power control sets, a frequency-hopping (FH) enabled or disabled indication, an FH starting PRB or second hop or number of hops or frequency-hopping width, a maximum code rate or number of PRBs for a PUCCH format, or an indication of simultaneous HARQ acknowledgment and CSI for PUCCH transmission.

Various embodiments of the present disclosure provide the UE with an RRC configuration using common and/or UE-specific RRC signaling where the UE is configured with a set of allowed or a set of disallowed slots in which PUCCH repetition can occur or cannot occur. The UE can be scheduled using dynamic grants or using configured grants. The UE determines a slot potentially available for PUCCH transmission in the PUCCH repetition using the new provided RRC configuration. The new provided RRC configuration can enable or disable and/or parameterize the use of the full-duplex or the normal UL slots respectively for PUCCH repetition by the UE.

Figure 8:
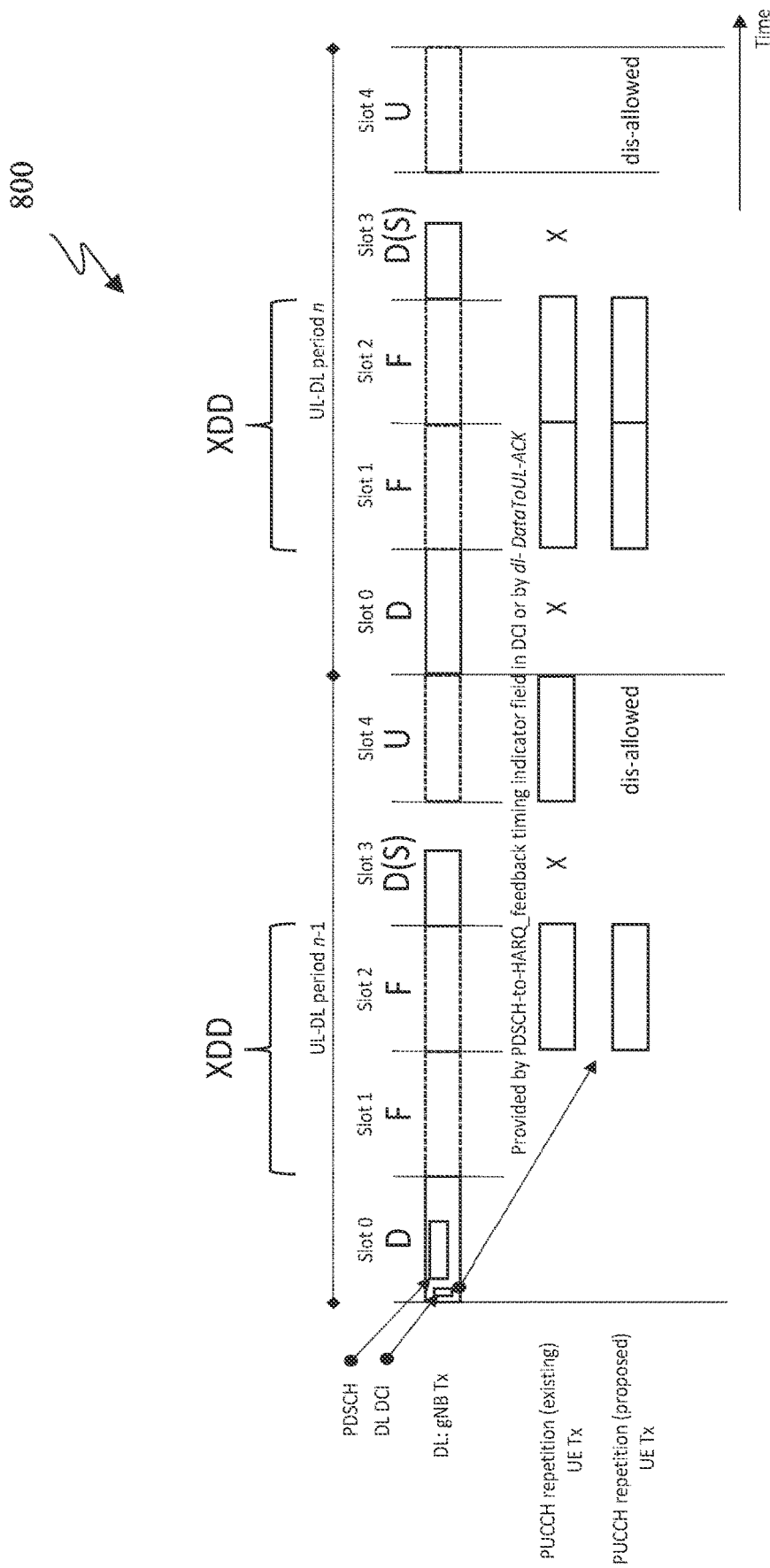
FIG. 8 illustrates an example PUCCH repetition with a configured set of allowed or set of disallowed slots in a full-duplex communications system according to embodiments of the disclosure.

FIG. 8 illustrates an example PUCCH repetition with a configured set of allowed or set of disallowed slots 800 according to embodiments of the disclosure. The embodiment of the PUCCH repetition with a configured set of allowed or set of disallowed slots 800 illustrated in FIG. 8 is for illustration only. FIG. 8 does not limit the scope of this disclosure to any particular implementation of the PUCCH repetition with a configured set of allowed or set of disallowed slots 800.

The gNB can configure the UE to only use the normal UL slots (but not the full-duplex slots), or to only use the full-duplex slots (but not the normal UL slots), or to use both the full-duplex and the normal UL slots together for PUCCH repetition. Only a subset of the full-duplex slots and/or a subset of the normal UL slots may be configured as potentially available slots for the PUCCH repetition. An example for the case where PUCCH repetition only uses the full-duplex slots is shown in FIG. 8. Note that it is not necessary that the use of full-duplex operation by the gNB when scheduling DL receptions and/or UL transmissions in a slot or symbol is identifiable by or known to the UE. Allowed or dis-allowed time-domain resources for the PUCCH repetition can be configured for and/or determined by the UE through several possible means, e.g., using the TDRA table, with reference to a slot/symbol type, using an absolute slot number with respect to a common DL time reference such as SFN and/or using slot/symbol number in a (sub-)frame, using a relative slot/symbol number determined with respect to a timing reference such as a slot/symbol associated with DCI reception or similar, or using a parameter value or setting.

When a PUCCH transmission in a PUCCH repetition uses a full-duplex slot, the UE selects a first PUCCH configuration associated with SBFD slots/symbols to determine one or more PUCCH transmission settings for the SBFD slot/symbol. For example, based on the first PUCCH configuration, the UE may select a value or a list or select a value from the list of DL data to UL Acknowledgment (ACK) timing(s) to determine a first PUCCH transmission of a PUCCH repetition in SBFD slots/symbols. For example and based on the first PUCCH configuration, the UE may determine the number of repetitions for use in SBFD slots/symbols, or a setting for an DMRS bundling indication in SBFD slots/symbols, or a cyclic or sequential mapping pattern for PUCCH repetition associated with spatial settings or power control sets in SBFD slots/symbols, or the configuration of frequency-hopping (FH) parameters such as enabled or disabled or FH starting PRB or second hop PRB on the SBFD slot/symbol, or a maximum code rate or number of PRBs for a PUCCH format when transmitted on an SBFD slot/symbol. When a PUCCH transmission in a PUCCH repetition uses a non-full-duplex slot, for example, an UL slot, the UE selects a second PUCCH configuration associated with non-SBFD slots/symbols to determine one or more PUCCH transmission settings for the non-SBFD slot/symbol. For example, based on the second PUCCH configuration, the UE may select a value or a list or select a value from the list of DL data to UL Acknowledgment (ACK) timing(s) to determine a first PUCCH transmission of a PUCCH repetition in non-SBFD slots/symbols. For example and based on the second PUCCH configuration, the UE may determine the number of repetitions for use in non-SBFD slots/symbols, or a setting for an DMRS bundling indication in non-SBFD slots/symbols, or a cyclic or sequential mapping pattern for PUCCH repetition associated with spatial settings or power control sets in non-SBFD slots/symbols, or the configuration of frequency-hopping (FH) parameters such as enabled or disabled or FH starting PRB or second hop PRB on the non-SBFD slot/symbol, or a maximum code rate or number of PRBs for a PUCCH format when transmitted on a non-SBFD slot/symbol.

For example, a number of repetitions $n_{rep,SBFD}=4$ may be provided or indicated to the UE for a PUCCH repetition using SBFD slots/symbols and a number of repetitions $n_{rep,non-SBFD}=2$ for a PUCCH repetition using non-SBFD slots/symbols. For example, a first list of DL data to UL Acknowledgment (ACK) timing(s) such as [2, 3, 5, 7] slots may be indicated and used by the UE to determine a first slot in a PUCCH repetition to occur in SBFD slots/symbols and a second list of DL data to UL Acknowledgment (ACK) timing(s) such as [5, 6, 8] slots to determine a first slot in a PUCCH repetition may be indicated and used by the UE to determine a first slot in a PUCCH repetition to occur in non-SBFD slots/symbols. For example, a first FH configuration may be provided to the UE for a PUCCH repetition using SBFD slots/symbols indicating that FH is enabled in SBFD slots/symbols using a first PRB and second hop PRB but a second FH configuration for a PUCCH repetition using non-SBFD slots/symbols indicates to the UE that FH is disabled on the non-SBFD slots/symbols. For example, a maximum code rate $cr_{SBFD}=$'zerodot25' may be provided or indicated to the UE for a PUCCH repetition using SBFD slots/symbols and a maximum code rate $cr_{non-SBFD}=$'zerodot60' for a PUCCH repetition using non-SBFD slots/symbols. For example, a number of PRBs $n_{PRB,SBFD}=4$ may be provided or indicated to the UE for a PUCCH repetition using SBFD slots/symbols and a number PRBs $n_{PRB,non-SBFD}=8$ for a PUCCH repetition using non-SBFD slots/symbols.

When the use of only normal UL slots for PUCCH repetition is configured for the UE, legacy UE behavior ensues, e.g., the UE transmits the PUCCH of a PUCCH repetition in slots of type U and/or F when scheduled by the gNB unless the PUCCH transmission is omitted as by REF3. When the use of only the full-duplex slots is configured for PUCCH repetition, following gNB scheduling, the UE does not transmit the PUCCH of a PUCCH repetition in slots of type U. The UE determines the potentially available slots for PUCCH transmission in a PUCCH repetition using the new RRC configuration. When the use of both full-duplex and normal UL slots is configured for PUCCH repetition, the UE transmits the PUCCH in slots of type U and/or F subject to gNB scheduling and where the UE determines potentially available slots using the new RRC configuration.

One reason to configure the allowed (or disallowed) time-domain resources for PUCCH repetition is to preserve the UL SE and UL data peak throughput for UEs in good link conditions without sacrificing the achievable UL radio range of the UL control signals for UEs in bad link conditions (or vice versa). When the gNB supports full-duplex operation, additional slots for UL transmissions can be made available to UEs in bad link conditions. These UEs can then use PUCCH repetition to increase their achievable UL radio range when transmitting the UL control signals using a larger number of slots when compared to a TDD cell without full-duplex operation which (in practice) has fewer normal UL slots. Fragmentation of the UL scheduling BW for data transmissions in the normal UL slot arising in consequence of the need for placement of the full-duplex UL subband in the carrier center from PUCCH repetition across both the full-duplex and normal UL slots as by existing state-of-the-art is eliminated. The maximum number of PUCCH repetitions, e.g., up to 8 can be supported.

Another reason is that the improved flexibility to configure the allowed (or disallowed) time-domain resources for PUCCH repetition allows to offset against losses resulting from different required transmit UE transmit power settings and different UL beamforming gains when using the full-duplex slots. Because of gNB antenna panel design, the UL reception in a full, e.g., normal, UL slot will use a different number of TRX and uses a larger effective Rx area when compared to the SBFD UL subband in an SBFD slot. A similar consideration applies to gNB DL transmissions in a full, e.g., normal, DL slot versus SBFD slots. For example, gNB Rx in a normal UL slot uses all the available 48 TRX using a 12Vx8Hx2P panel of size 40×60 cm. The gNB Rx in SBFD slots only uses 16 TRX and ⅓ of the panel for Rx mode whereas the remaining 32 TRX and ⅔ of the panel are used for the simultaneous DL transmissions. The gNB will collect less useful signal energy per received UL symbol in an SBFD slot when compared to an UL transmission by the UE in a normal UL slot. There is less link gain when comparing UL reception in full duplex vs. normal UL slots. Different antenna and panel designs exist to support gNB-side full-duplex operation. Design options may be expected to evolve over time as technology matures. Existing and expected future design options for antenna and panels have in common that the number of TRXs and the available Tx or Rx aperture area used for Tx and/or Rx in normal DL or UL slots are generally not the same when compared to the DL transmissions or UL receptions in SBFD slots. Increased flexibility for the gNB to control the time-domain allocations of PUCCH transmissions from UEs in a system supporting full-duplex operation is therefore beneficial to improve radio resource efficiency.

Figure 9:
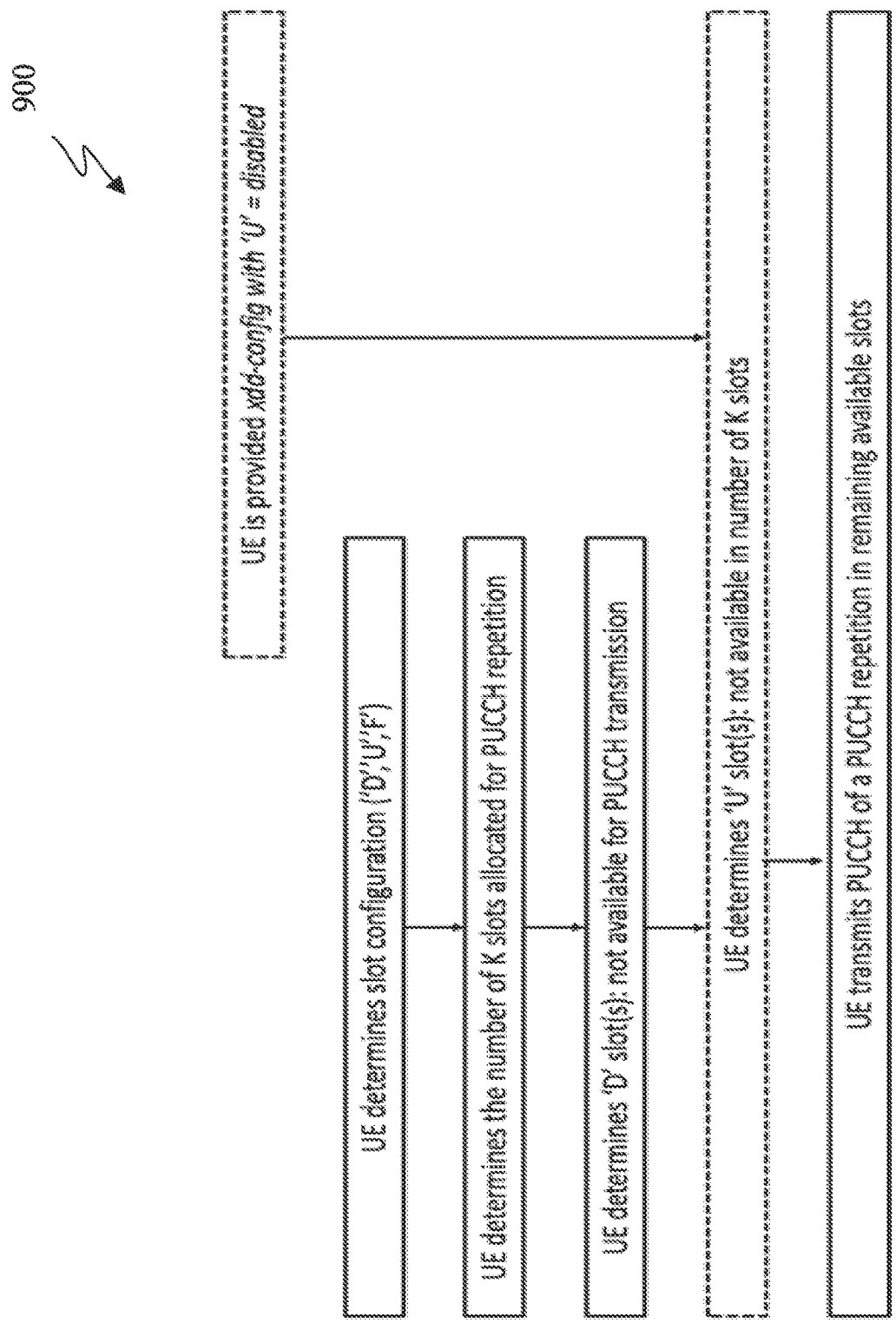
FIG. 9 illustrates flowchart of as example method for an UE determination of available slots for PUCCH repetition using common RRC according to embodiments of the disclosure.

FIG. 9 illustrates an example UE determination of available slots for PUCCH repetition using common RRC 900 according to embodiments of the disclosure. The embodiment of the UE determination of available slots for PUCCH repetition using common RRC 900 illustrated in FIG. 9 is for illustration only. FIG. 9 does not limit the scope of this disclosure to any particular implementation of the UE determination of available slots for PUCCH repetition using common RRC 900.

In one embodiment, the UE is provided with an RRC configuration using common RRC signaling such as a system information block (SIB), e.g., SIB1, where the UE is configured with a set of allowed or a set of disallowed slots in which a PUCCH transmission of a PUCCH repetition can occur or cannot occur.

The UE in a first step determines 'potentially available' slots or symbols for PUCCH transmission in a PUCCH repetition using the provided common RRC configuration. The UE in a second step determines 'available' slots or symbols for PUCCH transmission in a PUCCH repetition using the configured or provided number of repetitions associated with DL reception using dynamic grant or associated with DL semi-persistent transmission or associated with periodic, semi-persistent or aperiodic UCI transmissions such as CSI using PUCCH.

For determination by the UE of potentially available slots or symbols for PUCCH transmission in a PUCCH repetition using the provided common RRC configuration in the first step, several possibilities exist to provide the indication of allowed or disallowed slots to the UE(s).

In one example, the xdd-config provided by SIB can designate a slot or symbol as from one or a combination of types 'D', 'U', 'F', or 'N/A' using a time-domain pattern with configurable periodicity for a configuration period. The UE considers symbols in a slot indicated as 'D' by xdd-config to be potentially available for receptions, e.g., no PUCCH transmission is possible, and considers symbols in a slot indicated as 'U' by xdd-config to be potentially available for transmissions, e.g., PUCCH transmissions are possible. The UE considers symbols in a slot indicated as 'F' by xdd-config as potentially available for either reception or transmission where gNB scheduling determines the UE transmission or reception behavior. The UE considers symbols in a slot indicated as 'N/A' by xdd-config as unavailable for reception or transmission. The xdd-config is provided separately from tdd-UL-DL-ConfigurationCommon. A first slot or symbol type indicated by xdd-config may be independent from a second slot or symbol type 'D', 'U, 'F' indicated by tdd-UL-DL-ConfigurationCommon when provided for the same time-domain resource. In that case, the UE may rely on proper network configuration to ensure consistency between the first and the second slot or symbol type when both are provided. Alternatively, one of the slot or symbol types has priority, e.g., the slot or symbol type provided by tdd-UL-DL-ConfigurationCommon determines the UE behavior when both types are provided. Furthermore, a slot or symbol configuration of a first type provided by xdd-config may be applied only to some slot or symbol configuration types of the second type, e.g., the slot or symbol type provided by xdd-config may only be applied to symbols or slots not designated as 'D' by tdd-UL-DL-ConfigurationCommon type provided for a same time-domain resource. Note that the latter case is conceptually similar, but not identical to the case when tdd-UL-DL-ConfigurationDedicated is provided to the UE. One reason is that symbols or slots of type 'U' in tdd-UL-DL-ConfigurationCommon can still be designated by xdd-config as 'unavailable' for PUCCH transmissions even though the tdd-UL-DL-ConfigurationCommon may allow the use of the same time-domain resources for other types of UL transmissions, e.g., PUSCH, SRS, or RACH. Unlike tdd-UL-DL-ConfigurationDedicated which can only provide a UE-specific configuration for symbols or slots designated as 'F' in tdd-UL-DL-ConfigurationCommon, the slot or type assignments provided by xdd-config are not restricted, e.g., even 'D' slots or symbols in tdd-UL-DL-ConfigurationCommon may be used for PUCCH transmission by UEs supporting features for enhanced support of (gNB) full-duplex transmission.

The example of the single-carrier full-duplex configuration illustrated in FIG. 7 is considered. The gNB configures SIB1 tdd-UL-DL-ConfigurationCommon as {dl-UL-TransmissionPeriodicity, nrofDownlinkSlots, nrofDownlinkSymbols, nrofUplinkSlots, nrofUplinkSymbols}={P=2.5 ms, 3 DL slots, 12 DL sym, 0 UL sym, 1 UL slot} or DDDS(D)U. Accordingly, legacy UEs or UEs not supporting features for enhanced support of (gNB) full-duplex operation determine that any UL transmission(s) when scheduled can only occur in slot #5. When the gNB configures SIB1 xdd-config with N/A-U-U-N/A-U, the UE determines that UL transmission including PUCCH transmission of a PUCCH repetition can occur in slots #2, #3 and #5. When SIB1 xdd-config provides the configuration N/A-U-U-N/A-N/A to the UE, the UE determines that PUCCH transmission of a PUCCH repetition can occur in slots #2 and #3, but not in slot #5. Note that other UL transmissions, e.g., SRS, PUSCH, etc. as listed above may still be scheduled for the UE using the 'U' slot #5. When SIB1 tdd-UL-DL-ConfigurationCommon provides DFFSU while xdd-config provides N/A-U-U-N/A-N/A, the UE also determines that PUCCH transmission when scheduled can occur in slots #2 and #3, but not in slot #5. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the SBFD UL subband in the slot or symbol.

In one example, the xdd-config in the SIB provides a parameter, e.g., bit flag(s), setting(s), or value(s), indicating if PUCCH transmission is enabled or disabled for a slot type, e.g., slot types 'D', F' or 'U' indicated by tdd-UL-DL-ConfigurationCommon. A slot type indicated by the common RRC configuration may be associated with a single parameter provided by xdd-config and/or multiple such parameters, e.g., one parameter per slot type may be provided. A parameter provided by xdd-config may provide the setting for more than one slot or symbol type. The UE determines symbols in a slot indicated as 'F' by tdd-UL-DL-ConfigurationCommon potentially available for PUCCH transmission when a first parameter provided by xdd-config for PUCCH transmission is set to enabled for a first slot or symbol type 'F', otherwise the UE determines that the corresponding time-domain resource(s) are not available for PUCCH transmission. The xdd-config may provide a second parameter to indicate if PUCCH transmission is set to enabled for a second slot or symbol type 'U' provided by tdd-UL-DL-ConfigurationCommon. The UE determines symbols in a slot indicated as 'U' by tdd-UL-DL-ConfigurationCommon potentially available for PUCCH transmission when a second parameter provided by xdd-config for PUCCH transmission is set to enabled for slot type 'U', otherwise the UE determines that the corresponding time-domain resource(s) are not available for PUCCH transmission.

The example of the single-carrier full-duplex configuration in FIG. 7 is considered. The gNB configures SIB1 tdd-UL-DL-ConfigurationCommon as DFFSU. Legacy UEs or UEs not supporting features for enhanced support of (gNB) full-duplex operation determine that any UL transmission(s) when scheduled can only occur in slots #2, #3 and #5. The gNB configures SIB1 xdd-config using a first and a second parameter indicating 'enabled' or 'disabled' for a first slot type 'F' and a second slot type 'U' respectively. The first parameter is set to 'enabled' and the second parameter is set to 'disabled'. The UE determines that the full-duplex slots #2 and #3 are potentially available for PUCCH transmission, but not slot #5, e.g., the normal UL slot. Note that other UL transmissions, e.g., SRS, PUSCH, etc. as listed above may still be scheduled for the UE using the 'U' slot #5. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the SBFD UL subband in the slot or symbol. One reason is reduced signaling overhead when configuring time-domain transmission behavior in a TDD cell providing full-duplex support. Existing common RRC signaling providing slot type indications is re-used, but UL transmission behavior for existing slot or symbol types is modified by bit flags.

In one example, the xdd-config provides a bitmap indicating if PUCCH repetition is enabled or disabled for designated time-domain resources, e.g., slot(s) or symbol(s), associated with full-duplex slot(s) and/or normal UL slot(s). The bitmap can be defined using a fixed length or the bitmap can have a variable length for a suitable configurable periodicity. For example, the length of the bitmap can correspond to the UL-DL frame configuration period or pattern1 period or the combined pattern1 and/or pattern2 period(s) with reference to tdd-UL-DL-ConfigurationCommon. The UE considers symbols in a slot indicated as 'enabled' by xdd-config to be potentially available for PUCCH transmission. The UE considers symbols in a slot indicated as 'disabled' by xdd-config not to be available for PUCCH transmissions. A bit in the bitmap may indicate transmission settings for a group of symbols or slots. Multiple bitmaps may be provided, e.g., different bitmaps may apply to different types of UL channel(s) or signal(s), e.g., PUCCH, PUSCH, SRS, or PRACH, or different bitmaps may apply to different types of a same UL channel or signal, e.g., a first bitmap for PUCCH format 1 and a second bitmap for PUCCH format 3 transmission. The xdd-config is provided separately from tdd-UL-DL-ConfigurationCommon. The first slot or symbol type 'enabled' or 'disabled' is provided by xdd-config and a second slot or symbol type 'D', 'U, 'F' is provided by tdd-UL-DL-ConfigurationCommon. There may be an indication of the first and of the second type for a same time-domain resource. Note that only one slot or symbol type may be provided for some time-domain resources. In the case when only one of the slot or symbol types is provided for a time-domain resource, that slot or symbol type is applied by the UE. For example, when only a slot or symbol type 'enabled' is provided for a slot or symbol, the UE assumes DL reception "as if" it was configured with 'U' (and/or 'F') by tdd-UL-DL-ConfigurationCommon. For example, when only a slot or symbol type 'D' is provided for a slot or symbol, the UE assumes DL reception "as if" it was configured as 'disabled' by xdd-config. Furthermore, a slot or symbol configuration of the first type provided by xdd-config may be applied only for some slot or symbol configuration types of the second type, e.g., the slot or symbol type provided by xdd-config may only be applied to symbols or slots not designated as 'D' by tdd-UL-DL-ConfigurationCommon type provided for a same time-domain resource.

The example of the single-carrier full-duplex configuration illustrated in FIG. 7 is considered. The gNB configures SIB1 tdd-UL-DL-ConfigurationCommon as DFFS(D)U. Legacy UEs or UEs not supporting features for enhanced support of (gNB) full-duplex operation determine that any UL transmission(s) when scheduled can only occur in slots #2, #3 and #5. The gNB configures SIB1 xdd-config using a bitmap with values of 'enabled' or 'disabled' per slot and set to "01100" using length 5 corresponding to the DL-UL allocation period of the common TDD UL-DL frame configuration. The UE determines that the full-duplex slots #2 and #3 are potentially available for PUCCH transmission, but not slot #5, e.g., the normal UL slot. Note that other UL transmissions, e.g., SRS, PUSCH, etc. as listed above may still be scheduled for the UE using the 'U' slot #5. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the SBFD UL subband in the slot or symbol.

In one example, the xdd-config in the SIB can designate a slot or symbol as one of types 'simultaneous Tx-Rx', 'Rx only', or 'Tx only' using at least one time-domain pattern with configurable periodicity for a configuration period. The UE considers symbols in a slot indicated as 'Rx only' by xdd-config to be potentially available for receptions, e.g., no PUCCH transmission is possible, and considers symbols in a slot indicated as 'Tx only' by xdd-config to be potentially available for transmissions, e.g., PUCCH (or other types of UL) transmissions are possible when scheduled. The UE considers symbols in a slot indicated as 'simultaneous Tx-Rx' by xdd-config as potentially available for either reception or transmission, e.g., the gNB can schedule either DL transmissions or UL receptions in the time-domain resource. The xdd-config is provided separately from tdd-UL-DL-ConfigurationCommon. A first slot or symbol type 'simultaneous Tx-Rx', 'Rx only', or 'Tx only' is indicated by xdd-config and a second slot or symbol type 'D', 'U, 'F' is indicated by tdd-UL-DL-ConfigurationCommon. There may be an indication of the first and of the second type for a same time-domain resource. Note that only one slot or symbol type may be provided for some time-domain resources. In the case, when only one of the slot or symbol types is provided for a time-domain resource, that slot or symbol type is applied by the UE. For example, when only a slot or symbol type 'Rx only' is provided for a slot or symbol, the UE assumes DL reception "as if" it was configured with 'D' (and/or 'F') by tdd-UL-DL-ConfigurationCommon. For example, when only a slot or symbol type 'D' is provided for a slot or symbol, the UE assumes DL reception "as if" it was configured with 'Rx-only' by xdd-config. Furthermore, a slot or symbol configuration of the first type provided by xdd-config may be applied only for some slot or symbol configuration types of the second type, e.g., the slot or symbol type provided by xdd-config may only be applied to symbols or slots not designated as 'D' by tdd-UL-DL-ConfigurationCommon type provided for a same time-domain resource. The xdd-config also provides a parameter, e.g., bit flag(s), bitmap or (set of) value(s), indicating if PUCCH transmission is enabled or disabled for full-duplex slot(s) and/or for normal UL slot(s). For a slot or symbol where the UE determines the first slot or symbol type as 'simultaneous Tx-Rx', e.g., full-duplex slots or symbols, the UE determines the corresponding time-domain resource as potentially available for PUCCH transmission if a first bit flag provided by xdd-config indicates "PUCCH transmission in full-duplex slot(s) or symbol(s)", otherwise the UE determines only 'Tx-only' (or 'U') symbols or slots as potentially available. For slots or symbols where the UE determines the first slot or symbol type as 'Tx-only', e.g., normal UL slots or symbols, the UE determines the corresponding time-domain resource as potentially available for PUCCH transmission if a second bit flag provided by xdd-config indicates "PUCCH transmission in UL slot(s) or symbol(s)". When both the first and the second bit flags are set to enabled, then the UE determines that slots or symbols of types 'simultaneous Tx-Rx' and 'Tx only' are potentially available for UL transmission of PUCCH. A default rule may be used, e.g., the UE may determine that PUCCH transmission in a time-domain resource indicated as 'simultaneous Tx-Rx' (or 'F') symbols or slots are also potentially available when the first bit flag is set to enabled, but UL transmission unless otherwise configured is possible in all 'U' slots.

The example of the single-carrier full-duplex configuration in FIG. 7 is considered. The gNB configures SIB1 tdd-UL-DL-ConfigurationCommon as {dl-UL-TransmissionPeriodicity, nrofDownlinkSlots, nrofDownlinkSymbols, nrofUplinkSlots, nrofUplinkSymbols}={P=2.5 ms, 3 DL slots, 12 DL sym, 0 UL sym, 1 UL slot} or DDDSU. Legacy UEs or UEs not supporting features for enhanced support of (gNB) full-duplex operation determine that any UL transmission(s) when scheduled can only occur in slot #5. When the gNB configures SIB1 xdd-config with 'Rx-only'-'simultaneous Tx-Rx'-'simultaneous Tx-Rx', 'Rx-only', 'Tx-only', and the first bit flag enabling PUCCH transmission in full-duplex slots is set, but not the second bit flag enabling PUCCH transmission in the normal UL slot, the UE determines that UL transmission of PUCCH in a PUCCH repetition can occur in full-duplex slots #2 and #3. Note that other UL transmissions, e.g., SRS, PUSCH, etc. as listed above may still be scheduled for the UE using the 'U' slot #5. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the SBFD UL subband in the slot or symbol.

When the UE is provided with separate PUCCH configurations associated with different slot or symbol types, i.e., SBFD and non-SBFD slots/symbols or 'D' and 'F' and 'U', respectively, to indicate UE specific or of cell specific PUCCH parameters in a BWP or in a carrier for a cell group of carriers, the UE selects and determines a PUCCH configuration from the PUCCH configurations based on a slot or symbol type to determine the UL transmission parameters.

For example, separate PUCCH configurations associated with SBFD and non-SBFD slots/symbols, respectively, separate PUCCH format configurations, or separate PUCCH resources or PUCCH resources sets for SBFD and non-SBFD slots/symbols, respectively, may be provided or indicated to the UE. Separate values for a same parameter in a PUCCH configuration, in a PUCCH resource or resource set, or in PUCCH format may be provided as information to the UE where a first value of the parameter is indicated for use by the UE in a non-SBFD slots/symbols and a second value of the parameter then is indicated for use by the UE in an SBFD slot/symbol.

After the UE determines the potentially available slots or symbols for PUCCH transmission in a PUCCH transmission using the provided common RRC configuration, the UE determines the available slots for PUCCH transmission in a PUCCH repetition.

The example is considered where only tdd-UL-DL-ConfigurationCommon (but not tdd-UL-DL-ConfigurationDedicated) and the xdd-config using a bitmap with values of 'enabled' or 'disabled' per slot or per slot type is provided by SIB.

The UE first determines the number of repetitions K. A UE can be indicated to transmit a PUCCH over $N_{PUCCH}^{repeat}$ slots using a PUCCH resource, where if the PUCCH resource is indicated by a DCI format and includes parameter PUCCH-nrofSlots, $K=N_{PUCCH}^{repeat}$ is provided by PUCCH-nrofSlots, otherwise, $K=N_{PUCCH}^{repeat}$ is provided by parameter nrofSlots. If the UE is provided parameter subslotLengthForPUCCH, a slot for a PUCCH transmission with repetitions over $N_{PUCCH}^{repeat}>1$ slots includes a number of symbols indicated by subslotLengthForPUCCH.

For $N_{PUCCH}^{repeat}>1$, the UE repeats the PUCCH transmission with the UCI over $N_{PUCCH}^{repeat}$ slots. A PUCCH transmission in each of the $N_{PUCCH}^{repeat}$ slots has a same number of consecutive symbols, as provided by nrofSymbols. A PUCCH transmission in each of the $N_{PUCCH}^{repeat}$ slots has a same first symbol, as provided by parameter startingSymbolIndex if subslotLengthForPUCCH is not provided; otherwise mod(startingSymbolIndex, subslotLengthForPUCCH).

If the UE determines that, for a PUCCH transmission in a slot, the number of symbols available for the PUCCH transmission is smaller than the value provided by nrofSymbols for the corresponding PUCCH format, the UE does not transmit the PUCCH in the slot. If the parameter xdd-config, when provided for a PUCCH transmission in a symbol or slot indicates that the symbol or slot is not available for PUCCH transmission of a PUCCH repetition, the UE does not transmit the PUCCH in the symbol or slot.

A SS/PBCH block symbol is a symbol of an SS/PBCH block with candidate SS/PBCH block index corresponding to the SS/PBCH block index indicated to a UE by parameter ssb-PositionsInBurst in SIB1 or ssb-PositionsInBurst in RRC ServingCellConfigCommon, as described in REF3.

For unpaired spectrum, the UE determines the $N_{PUCCH}^{repeat}$ slots for a PUCCH transmission starting from a slot indicated to the UE for HARQ-ACK reporting, or a slot determined for SR reporting as described in REF3 or a slot for CSI reporting as described in REF4, and having an UL symbol or flexible symbol that is not SS/PBCH block symbol provided by startingSymbolIndex as a first symbol, and having consecutive UL symbols or flexible symbols that are not SS/PBCH block symbols, starting from the first symbol, equal to or larger than a number of symbols provided by nrofSymbols as described in REF3, and where the availability of the symbol or slot when indicated by xdd-config is set to "enable".

For paired spectrum or supplementary uplink band, the UE determines the $K=N_{PUCCH}^{repeat}$ slots for a PUCCH transmission as the $N_{PUCCH}^{repeat}$ consecutive slots starting from a slot indicated to the UE for HARQ-ACK reporting, or a slot determined for SR reporting as described in REF3 or a slot for CSI reporting as described in REF4. If the parameter xdd-config, when provided for a PUCCH transmission in a symbol or slot indicates that the symbol or slot is not available for PUCCH transmission of a PUCCH repetition, the UE does not transmit the PUCCH in the symbol or slot.

In one embodiment, the UE is provided with an RRC configuration using UE-specific RRC signaling where the UE is configured with a set of allowed or a set of disallowed slots in which PUCCH repetition can occur or cannot occur. For example, the UE-specific RRC signaling may be provided to the UE in IEs such as pucch-Config, pucch-ConfigCommon, BWP-UplinkCommon, BWP-UplinkDedicated or ServingCellConfig and/or in IEs such as tdd-UL-DL-ConfigurationDedicated and/or slotFormatCombination. For example, the UE-specific RRC signaling for the UE to determine a set of allowed or a set of dis-allowed slots in which PUCCH repetition can occur or cannot occur may be provided by RRC as part of a PUCCH resource set configuration, a PUCCH resource configuration, and/or may be provided in a configuration associated with dl-DataToUL-ACK or the PDSCH-to-HARQ feedback timing indicator field for a DCI.

The UE in a first step determines 'potentially available' slots or symbols for PUCCH transmission in a PUCCH repetition using the provided UE-specific RRC configuration. The UE in a second step determines 'available' slots or symbols for PUCCH transmission in a PUCCH repetition using the configured or provided number of repetitions associated with DL reception using dynamic grant or associated with DL semi-persistent transmission or associated with periodic, semi-persistent or aperiodic UCI transmissions such as CSI using PUCCH.

In one example, the PUCCH configuration, e.g., pucch-Config, provides a parameter, e.g., bit flag(s), setting(s), or value(s), indicating if PUCCH transmission is enabled or disabled for a slot type, e.g., slot types 'D', F' or 'U' indicated by the TDD UL-DL frame configuration and/or SFI, e.g., tdd-UL-DL-ConfigurationCommon, tdd-UL-DL-ConfigurationDedicated or slotFormat. A slot type indicated by the TDD UL-DL frame configuration and/or SFI may be associated with a single parameter provided by the PUCCH configuration and/or multiple such parameters, e.g., one parameter per slot type may be provided. A parameter provided by the PUCCH configuration may provide the setting for more than one slot or symbol type. The UE determines symbols in a slot indicated as 'F' potentially available for PUCCH transmission when a first parameter provided by the PUCCH configuration for PUCCH transmission is set to enabled for a first slot or symbol type 'F', otherwise the UE determines that the corresponding time-domain resource(s) are not available for PUCCH transmission. The PUCCH configuration may provide a second parameter to indicate if PUCCH transmission is set to enabled for a second slot or symbol type 'U'. The UE determines symbols in a slot indicated as 'U' potentially available for PUCCH transmission when a second parameter provided by the PUCCH configuration for PUCCH transmission is set to enabled for slot type 'U', otherwise the UE determines that the corresponding time-domain resource(s) are not available for PUCCH transmission.

The example of the single-carrier full-duplex configuration illustrated in FIG. 7 is considered. The gNB configures SIB1 tdd-UL-DL-ConfigurationCommon as DFFSU. Legacy UEs or UEs not supporting features for enhanced support of (gNB) full-duplex operation determine that any UL transmission(s) when scheduled can only occur in slots #2, #3 and #5. The gNB provides a PUCCH configuration to the UE using a first and a second parameter indicating 'enabled' or 'disabled' for a first slot type 'F' and a second slot type 'U' respectively. The first parameter is set to 'enabled' and the second parameter is set to 'disabled'. The UE determines that the full-duplex slots #2 and #3 are potentially available for PUCCH transmission of a PUCCH repetition, but not slot #5, e.g., the normal UL slot. Note that other types of UL transmissions such as SRS or PUSCH as described above may still be scheduled for the UE using the 'U' slot #5. Note that the UE determination of UL transmission(s) using the full-duplex slots #2 and #3 of the example provided by FIG. 7 may include additional transmission or reception parameters provided by the PUCCH configuration, such as frequency-domain behavior of a transmission in a full-duplex slot, e.g., start, size and/or end of the SBFD UL subband in the slot or symbol.

In one example, the PUCCH configuration provides a parameter, e.g., bit flag(s), setting(s), or value(s) per index row of the table indicating if PUCCH transmission of a PUCCH repetition is enabled or disabled for designated slots. The PUCCH resource configuration indicates the configured number of repetitions for a selected PUCCH resource. A new parameter txType is provided for the selected PUCCH resource. The txType indicates if PUCCH transmission in a PUCCH repetition is enabled or disabled in designated slots. One reason is that this approach preserves existing state-of-the-art RRC configuration signaling for PUCCH repetition, e.g., existing protocol design can be mostly reused with additional control introduced to selectively allow or disallow selected time-domain resources.

For example, txType can designate a slot or symbol as one or a combination of types 'D', 'U', 'F', or 'N/A' with reference to a time-domain pattern with configurable periodicity for a configuration period, e.g., with reference to slot types 'D', F' or 'U' determined using the TDD UL-DL frame configuration(s) and/or using the SFI. In another example, txType can designate a slot or symbol type 'simultaneous Tx-Rx', 'Rx only', or 'Tx only' with reference to the xdd-config. In another example, txType can designate a slot or symbol with reference to a bitmap or a list of slots or symbols (or groups thereof) indicating if PUCCH repetition is enabled or disabled in the time-domain resources where a bitmap or list of slots may be configured separately by RRC, e.g., using the PUCCH configuration.

The UE selects a PUCCH resource set. The UE selects a PUCCH resource in a PUCCH resource set, e.g., using PRI. The UE determines the number of repetitions for the selected PUCCH resource and the new parameter txType associated with the PUCCH resource. txType may be configured differently for different PUCCH resources. No txType may be provided for a PUCCH resource or a default behavior may be defined for a PUCCH resource. For example, a first PUCCH resource may allow for PUCCH transmission of a PUCCH repetition using slot type 'Tx-only' only, whereas a second PUCCH resource of a PUCCH may allow for PUCCH transmission of a PUCCH repetition using slot type 'simultaneous Tx-Rx'.

Using different txType settings per PUCCH resource, a first PUCCH repetition, e.g., resulting in a number of PUCCH repetitions in K slots, can be allocated to different slot types than a second (later) PUCCH repetition. Note that instead of configuring a parameter txType for a PUCCH resource, txType may be alternatively configured for a PUCCH resource set or for a PUCCH format.

The example of the single-carrier full-duplex configuration in FIG. 7 is considered. The gNB configures SIB1 tdd-UL-DL-ConfigurationCommon as DDDSU. Legacy UEs or UEs not supporting features for enhanced support of (gNB) full-duplex operation determine that any UL transmission(s) when scheduled can only occur in slot #5. The gNB provides a PUCCH configuration using a parameter txType associated with a list of disallowed slots for a PUCCH resource. The list may be explicitly provided in the PUCCH configuration or be provided separately using other RRC signaling messages or IEs. For illustration purposes, it is assumed that slot numbers start with 0 and are referenced with respect to the slot numbers of the UL-DL frame configuration. A PUCCH resource set is configured for the UE. A first PUCCH resource in the set is configured with 4 repetitions and txType=[4] indicating PUCCH transmissions of a PUCCH repetition can occur in normal UL slots, e.g., in slot #5, but not in the other slots. A second PUCCH resource in the set is configured with 8 repetitions and txType=[1, 2] indicating PUCCH transmissions of a PUCCH repetition can occur in the full-duplex slots, e.g., slots #2 and #3, but not in the other slots. The UE receives a first DL grant DCI in slot #1, e.g., of type 'D', resulting in selection of the first PUCCH resource and a first PUCCH transmission of a PUCCH repetition determined in slot #5. The UE determines that slot #5, e.g., the normal UL slot is potentially available, but all other slots are not available. After termination of the first PUCCH repetition, the UE receives a second (later) DL grant DCI in DL slot #1 resulting in selection of the second PUCCH resource in the PUCCH resource set. The UE determines that the full-duplex slots #2 and #3 are available for PUCCH transmission of a PUCCH repetition, but not slot #1, #4, #5, e.g., the normal UL slot is not available. Note that the UE determination of UL transmission(s) using the full-duplex slots #2 and #3 of the example provided by FIG. 7 may include additional transmission or reception parameters provided by the PUCCH configuration, such as frequency-domain behavior of a transmission in a full-duplex slot, e.g., start, size and/or end of the SBFD UL subband in the slot or symbol.

Figure 10:
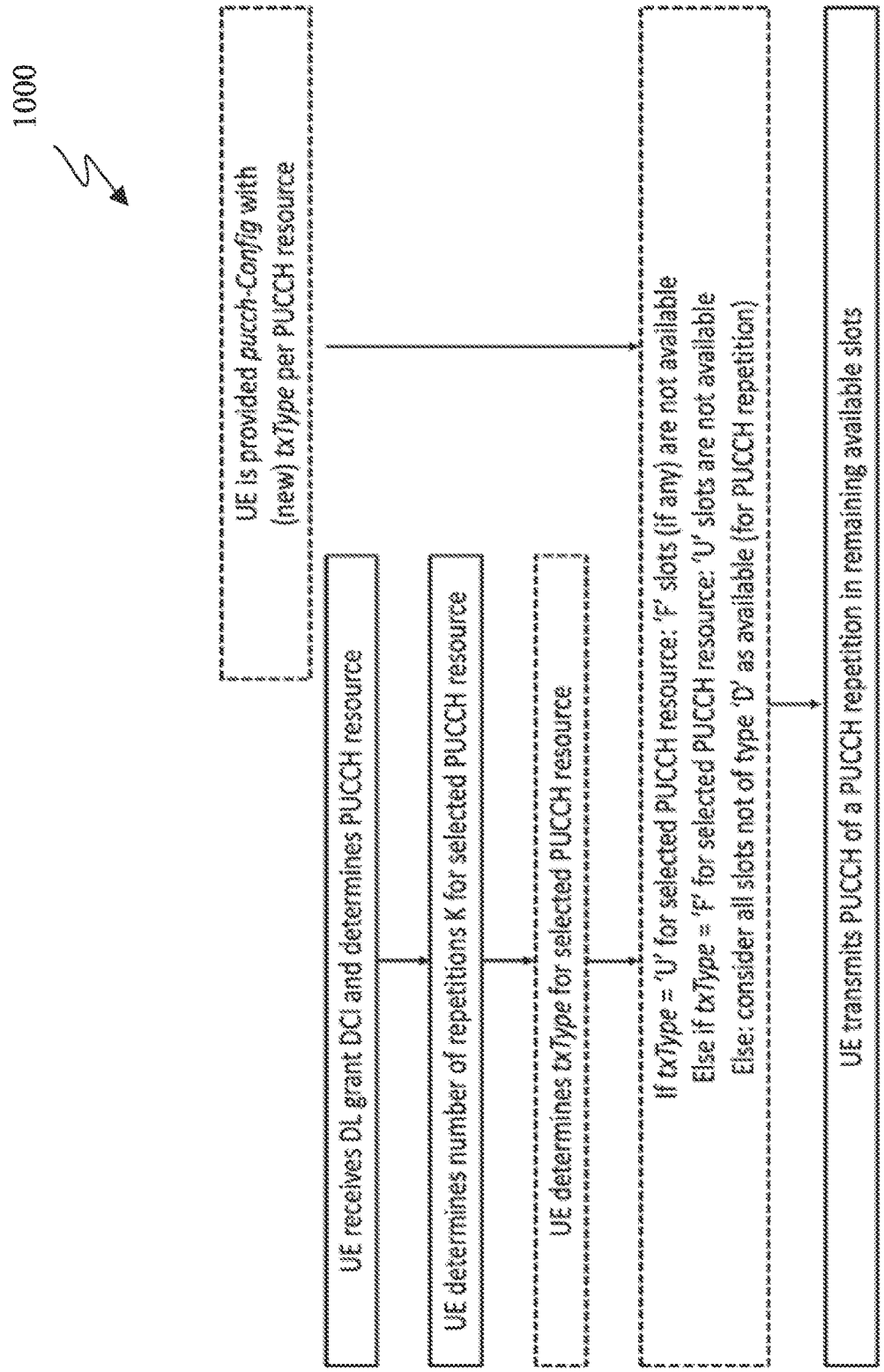
FIG. 10 illustrates flowchart of as example method for an UE determination of available slots for PUCCH repetition using PUCCH configuration according to embodiments of the disclosure.

FIG. 10 illustrates an example UE determination of available slots for PUCCH repetition using PUCCH configuration 1000 according to embodiments of the disclosure. The embodiment of the UE determination of available slots for PUCCH repetition using PUCCH configuration 1000 illustrated in FIG. 10 is for illustration only. FIG. 10 does not limit the scope of this disclosure to any particular implementation of the UE determination of available slots for PUCCH repetition using PUCCH configuration 1000.

In one example, the PUCCH configuration, e.g., pucch-Config, provides a bitmap or a list of slots or symbols (or groups thereof) indicating if PUCCH repetition is enabled or disabled for designated time-domain resources, e.g., slot(s) or symbol(s), associated with full-duplex slot(s) and/or normal UL slot(s). The bitmap can be defined using a fixed length or the bitmap can have a variable length for a suitable configurable periodicity. For example, the length of the bitmap can correspond to the UL-DL frame configuration period or pattern1 period or the combined pattern1 and/or pattern2 period(s) with reference to tdd-UL-DL-ConfigurationCommon or tdd-UL-DL-ConfigurationDedicated or with reference to the length of the slotFormat. The UE considers symbols in a slot indicated as 'enabled' by the PUCCH configuration to be potentially available for PUCCH transmission. The UE considers symbols in a slot indicated as 'disabled' by the PUCCH configuration not to be available for PUCCH transmissions. A bit in the bitmap may indicate transmission settings for a group of symbols or slots. Multiple bitmaps may be provided, e.g., different bitmaps may apply to different types of UL channel(s) or signal(s), e.g., PUCCH, PUSCH, SRS, or PRACH, or different bitmaps may apply to different types of a same UL channel or signal, e.g., a first bitmap for PUCCH format 1 and a second bitmap for PUCCH format 3. When a list of slots or symbols (or groups thereof) is used for indication in the PUCCH configuration, the allowed or disallowed time-domain resources for PUCCH transmission are identified using an absolute or relative slot or symbol number numbered with respect to a suitable timing reference. Multiple lists may be provided, or multiple lists may apply to different types of UL channel(s) or signal(s) or UL transmission behavior of the same UL channel or signal, e.g., a first list for PUCCH format 1 and a second list for PUCCH format 3. The UE considers symbols in a slot listed as 'allowed' or 'included' by the PUCCH configuration to be potentially available for PUCCH transmission. The UE considers symbols in a slot not listed or 'disallowed' not to be available for PUCCH transmission.

The example of the single-carrier full-duplex configuration illustrated in FIG. 7 is considered. The gNB configures SIB1 tdd-UL-DL-ConfigurationCommon as DFFSU. Legacy UEs or UEs not supporting features for enhanced support of (gNB) full-duplex operation determine that any UL transmission(s) when scheduled can only occur in slots #2, #3 and #5. The gNB provides a PUCCH configuration using a bitmap with values of 'enabled' or 'disabled' per slot and set to "01100" using length 5 corresponding to the DL-UL allocation period of the common TDD UL-DL frame configuration. Alternatively, the gNB configures a list of allowed slots for PUCCH repetition using the PUCCH configuration as [1, 2] where slots are numbered starting from 0. The UE determines that the full-duplex slots #2 and #3 are potentially available for PUCCH transmission, but not slot #5, e.g., the normal UL slot. Note that other UL transmissions, e.g., SRS, PUSCH, etc. as listed above may still be scheduled for the UE using the 'U' slot #5. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the UL subband in the slot or symbol.

When the UE is provided with separate PUCCH configurations associated with different slot or symbol types, i.e., SBFD and non-SBFD slots/symbols or 'D' and 'F' and 'U', respectively, to indicate UE specific or of cell specific PUCCH parameters in a BWP or in a carrier for a cell group of carriers, the UE selects and determines a PUCCH configuration from the PUCCH configurations based on a slot or symbol type to determine the UL transmission parameters.

For example, separate PUCCH configurations associated with SBFD and non-SBFD slots/symbols, respectively, separate PUCCH format configurations, or separate PUCCH resources or PUCCH resources sets for SBFD and non-SBFD slots/symbols, respectively, may be provided or indicated to the UE. Separate values for a same parameter in a PUCCH configuration, in a PUCCH resource or resource set, or in PUCCH format may be provided as information to the UE where a first value of the parameter is indicated for use by the UE in a non-SBFD slots/symbols and a second value of the parameter then is indicated for use by the UE in an SBFD slot/symbol.

After the UE determines the potentially available slots or symbols for PUCCH transmission in a PUCCH transmission using the provided UE-specific RRC configuration, the UE determines the available slots for PUCCH transmission in a PUCCH repetition.

The example is considered where only tdd-UL-DL-ConfigurationCommon (but not tdd-UL-DL-ConfigurationDedicated) and the xdd-config using a bitmap pucchTdmMask with values of 'enabled' or 'disabled' per slot is provided by the PUCCH configuration, e.g., as part of the RRC configuration associated with a PUCCH format or associated with a PUCCH resource or associated with a PUCCH resource set. Note that the UE-specific signaling in Rel-15 NR and beyond may use either one or a combination of UE-common and UE-specific IEs in the RRC signaling messages transmitted to the UE.

The UE first determines the number of repetitions K. A UE can be indicated to transmit a PUCCH over $N_{PUCCH}^{repeat}$ slots using a PUCCH resource, where if the PUCCH resource is indicated by a DCI format and includes parameter PUCCH-nrofSlots, $K=N_{PUCCH}^{repeat}$ is provided by PUCCH-nrofSlots, otherwise, $K=N_{PUCCH}^{repeat}$ is provided by parameter nrofSlots. If the UE is provided parameter subslotLengthForPUCCH, a slot for a PUCCH transmission with repetitions over $N_{PUCCH}^{repeat}>1$ slots includes a number of symbols indicated by subslotLengthForPUCCH.

For $N_{PUCCH}^{repeat}>1$, the UE repeats the PUCCH transmission with the UCI over $N_{PUCCH}^{repeat}$ slots. A PUCCH transmission in each of the $N_{PUCCH}^{repeat}$ slots has a same number of consecutive symbols, as provided by nrofSymbols. A PUCCH transmission in each of the $N_{PUCCH}^{repeat}$ slots has a same first symbol, as provided by parameter startingSymbolIndex if subslotLengthForPUCCH is not provided; otherwise mod(startingSymbolIndex, subslotLengthForPUCCH).

If the UE determines that, for a PUCCH transmission in a slot, the number of symbols available for the PUCCH transmission is smaller than the value provided by nrofSymbols for the corresponding PUCCH format, the UE does not transmit the PUCCH in the slot. If the parameterpucchTdmMask provided by pucch-Config, when configured for a PUCCH transmission in a slot indicates that the slot is not available for PUCCH transmission of a PUCCH repetition, the UE does not transmit the PUCCH in the slot.

An SS/PBCH block symbol is a symbol of an SS/PBCH block with candidate SS/PBCH block index corresponding to the SS/PBCH block index indicated to a UE by parameter ssb-PositionsInBurst in SIB1 or ssb-PositionsInBurst in RRC ServingCellConfigCommon, as described in REF3.

For unpaired spectrum, the UE determines the $N_{PUCCH}^{repeat}$ slots for a PUCCH transmission starting from a slot indicated to the UE for HARQ-ACK reporting, or a slot determined for SR reporting as described in REF3 or a slot for CSI reporting as described in REF4, and having an UL symbol or flexible symbol that is not SS/PBCH block symbol provided by startingSymbolIndex as a first symbol, and having consecutive UL symbols or flexible symbols that are not SS/PBCH block symbols, starting from the first symbol, equal to or larger than a number of symbols provided by nrofSymbols as described in REF3, and where the availability of the slot when indicated by pucchTdmMask is set to "enabled".

For paired spectrum or supplementary uplink band, the UE determines the $N_{PUCCH}^{repeat}$ slots for a PUCCH transmission as the $N_{PUCCH}^{repeat}$ consecutive slots starting from a slot indicated to the UE for HARQ-ACK reporting, or a slot determined for SR reporting as described in REF3 or a slot for CSI reporting as described in REF4. If the parameter pucchTdmMask provided by pucch-Config, when configured for a PUCCH transmission in a slot indicates that the slot is not available for PUCCH transmission of a PUCCH repetition, the UE does not transmit the PUCCH in the slot.

Figure 11:
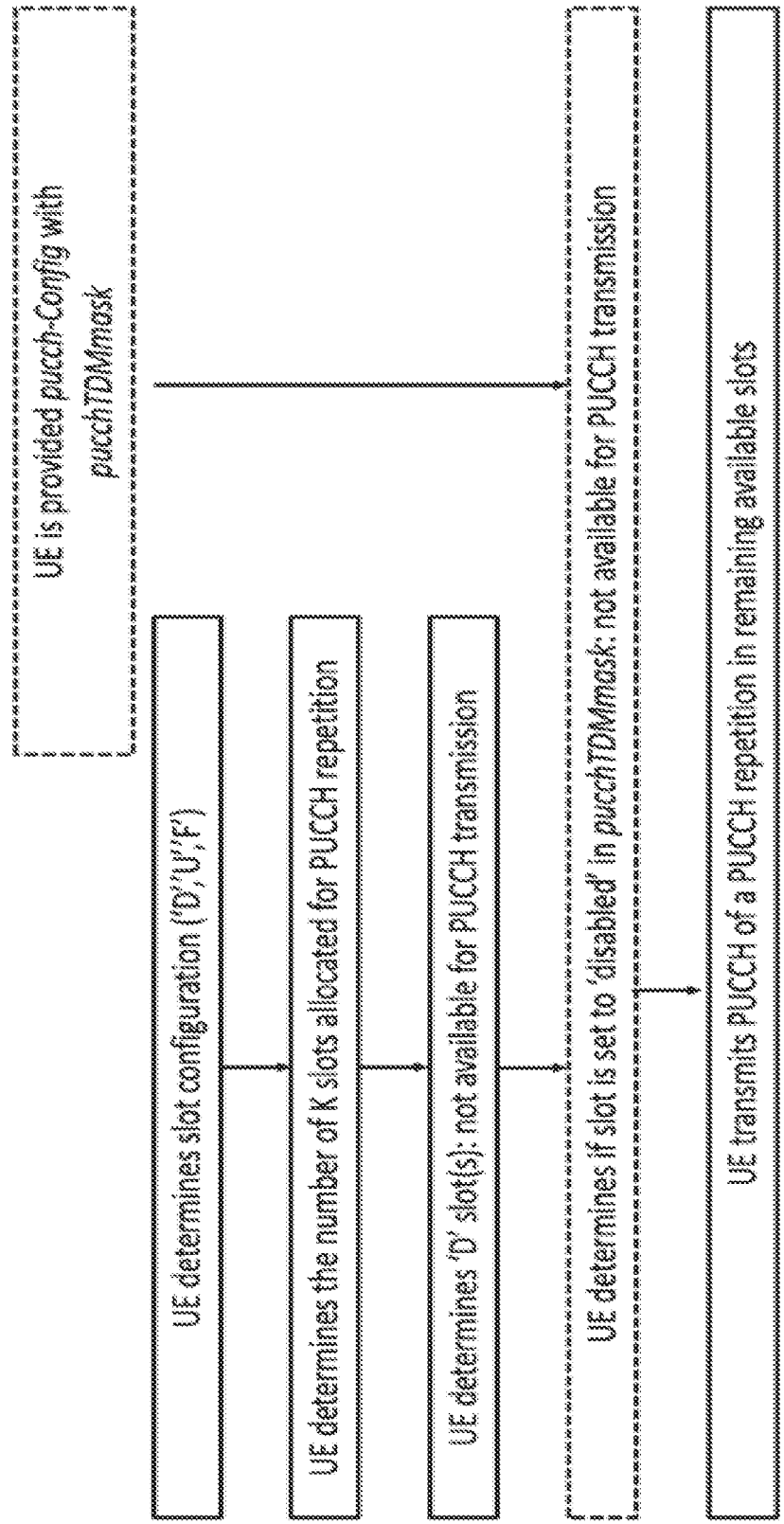
FIG. 11 illustrates an example UE determination of available slots for PUCCH repetition using UE-specific RRC according to embodiments of the disclosure.

FIG. 11 illustrates an example UE determination of available slots for PUCCH repetition using UE-specific RRC 1100 according to embodiments of the disclosure. The embodiment of the UE determination of available slots for PUCCH repetition using UE-specific RRC 1100 illustrated in FIG. 11 is for illustration only. FIG. 11 does not limit the scope of this disclosure to any particular implementation of the UE determination of available slots for PUCCH repetition using UE-specific RRC 1100.

In one embodiment, the UE is provided with an RRC configuration where the UE is configured with a set of allowed or a set of disallowed slots in which PUCCH repetition can occur or cannot occur using a list or sequence of PUCCH resource allocations in time-domain. The list or sequence may use SLIV values, or starting symbol and length pairs, or any other suitable signaling representation when designating slots or symbols allowed or not allowed for PUCCH transmissions. The list or sequence may have a fixed maximum length, e.g., N=8. The list or sequence may have length 1, e.g., only a single PUCCH transmission will ensue. The list or sequence may have a configurable or a default number for the number of PUCCH transmissions of a PUCCH repetition. There may be only one or multiple lists or sequences of PUCCH resource allocations. For example, a list or sequence of PUCCH resource allocations may be provided by RRC as part of a PUCCH resource set configuration, a PUCCH resource configuration, and/or may be provided in a configuration associated with dl-DataToUL-ACK or the PDSCH-to-HARQ feedback timing indicator field for a DCI. For example, the UE can be provided with one or multiple lists or sequences of PUCCH resource allocations in time-domain using UE-specific RRC signaling in IEs such as pucch-Config, pucch-ConfigCommon, BWP-UplinkCommon, BWP-UplinkDedicated or ServingCell-Config. Note that the UE-specific signaling as in Rel-15 NR and beyond may use either one or a combination of UE-common and UE-specific IEs in the RRC signaling messages transmitted to the UE. The RRC provided PUCCH configuration can enable or disable and/or parameterize the use of the full-duplex or the normal UL slots respectively for PUCCH repetition by the UE. A default list or sequence of PUCCH resource allocations in time-domain for PUCCH repetition may be provided by system specifications. The use of a default list or sequence of PUCCH resource allocations for PUCCH repetition may be configured by higher layers for the UE. Different lists or sequences of PUCCH resource allocations in time domain of a PUCCH repetition may be provided for different PUCCH types, e.g., PUCCH format 1, format 3, or format 4, or for different PUCCH resources or for different PUCCH resource sets.

The UE may use the provided list or sequence of PUCCH resource allocations in the RRC configuration of allowed or disallowed slots for PUCCH repetition to determine if a PUCCH transmission in a slot or symbol can occur or cannot occur during the PUCCH resource selection, e.g., a list or sequence associated with the determined PUCCH resource, or with the dl-DataToUL-ACK or the PDSCH-to-HARQ feedback timing indicator field in a DCI is selected by the UE to determine in which slots or symbols the PUCCH transmission can occur or cannot occur. Alternatively, one of multiple lists or sequences of PUCCH resource allocations are configured for a UE by RRC and one of the lists or sequences of the configured possible PUCCH resource allocations is then indicated by DCI to the UE. The UE then determines potentially available slots for the PUCCH transmission of a PUCCH repetition using the selected list or sequence of PUCCH resource allocations using the index provided by DCI. The DCI resulting in a PUCCH transmission by the UE can be associated with DL reception using dynamic grant or associated with DL semi-persistent transmission. The PUCCH transmission by the UE can be associated with periodic, semi-persistent or aperiodic UCI transmissions such as CSI.

The UE in a first step determines 'potentially available' slots or symbols for PUCCH transmission in a PUCCH repetition using the provided UE-specific RRC configuration with a list or sequence of PUCCH resource allocations. The UE in a second step determines 'available' slots or symbols for PUCCH transmission in a PUCCH repetition using the configured or indicated list of PUCCH resource allocations associated with DL reception using dynamic grant or associated with DL semi-persistent transmission or associated with periodic, semi-persistent or aperiodic UCI transmissions such as CSI using PUCCH.

In one example, the list or sequence of PUCCH resource allocations providing an indication if PUCCH transmission of a PUCCH repetition is allowed or disallowed for designated slots uses a SLIV value or startingSymbolIndex and nrofSymbols value pair for each slot. Alternatively, another suitable signal representation may be chosen, e.g., a value of 0 when PUCCH transmission is 'disabled' in a slot and a value of 1 when PUCCH transmission is 'disabled' in a slot. Note that the (same or different) PUCCH symbol allocation in a slot for PUCCH repetition may then be provided separately. For simplicity and illustration purposes, the following example uses SLIV values.

Each provided symbol allocation of the list or sequence designates a symbol allocation for a PUCCH transmission of a PUCCH transmission in a slot. One possible setting or value of the symbol allocation in a slot may be "invalid" or "skip", e.g., no symbol allocation for PUCCH transmission in the corresponding slot. A sequence or list of symbol allocations for the PUCCH resource allocation in time-domain is configured for the PUCCH repetition, e.g., one symbol allocation is provided for each slot for a number of slots. The length of the sequence or list of symbol allocations in the PUCCH repetition can correspond to the number of repetitions K of the PUCCH repetition for a selected PUCCH resource, resource set or for a PUCCH format. The length of the sequence or list of symbol allocations may be less than K and the sequence or list is repeated in full and/or partially to match the desired number of repetitions which may be configured separately for a PUCCH resource, resource set or for a PUCCH format. A sequence of list of symbol allocations for a PUCCH resource allocation may be defined with respect to consecutive time-domain resources, or with respect to non-consecutive time-domain resources as by a suitable set of rules. A symbol allocation of type "invalid" or "skip" indicates if PUCCH transmission in a PUCCH repetition is enabled or disabled in designated slots. By configuring the symbol allocation in a suitable way using "invalid" settings, e.g., PUCCH transmission of a PUCCH repetition can be scheduled using either the full-duplex slots only, or the UL slots only, or both full-duplex slots and normal UL slots, or any desired subset of time-domain resources.

One reason is that this approach reuses protocol design features already available in NR, e.g., PUSCH configuration for multi-TTI PUSCH operation, e.g., existing protocol design can be mostly reused for PUCCH repetition with suitable design changes to selectively allow or disallow selected time-domain resources for PUCCH repetition.

The UE selects a PUCCH resource set. The UE selects a PUCCH resource in a PUCCH resource set, e.g., using PRI. The UE determines the number of repetitions for the selected PUCCH resource. The UE determines the symbol allocations and/or number of repetitions if provided for the selected PUCCH resource. Different sequences or lists of PUCCH symbol allocations may be configured for different PUCCH resources, resource sets or for different PUCCH formats. Sequences or lists of different PUCCH resources, resource sets or PUCH formats may have different lengths including possible configurations using length=0, e.g., no valid allocation, or length=1, e.g., PUCCH transmission in a single slot. Sequences or lists of different PUCCH resource allocations may use different values. A restriction and/or constraint imposed on allowed symbol allocation values may be defined. For example, when the UE is configured with PUCCH repetition, the UE expects to be configured only with a single (valid) symbol allocation value other than value "invalid" or "skip" in the sequence or list of the PUCCH resource allocation, e.g., a same PUCCH symbol allocation in a slot must be used in all slots of a PUCCH repetition except the slots which are to be skipped (as indicated by a symbol allocation value "invalid). Using different lists or sequences of PUCCH symbol allocations for the PUCCH resource allocation in time-domain allows to set one or more of the symbol allocations in the sequence or list to "invalid" or "skip". For example, a first PUCCH resource may allow for PUCCH transmission of a PUCCH repetition using slot type 'Tx-only' only, whereas a second PUCCH resource of a PUCCH may allow for PUCCH transmission of a PUCCH repetition using slot type 'simultaneous Tx-Rx'.

The example of the single-carrier full-duplex configuration illustrated in FIG. 7 is considered. The gNB configures SIB1 tdd-UL-DL-ConfigurationCommon as DFFS(D)U. Legacy UEs or UEs not supporting features for enhanced support of (gNB) full-duplex operation determine that any UL transmission(s) when scheduled can only occur in slots #2, #3 and #5. The gNB provides a PUCCH configuration with a list or sequence of SLIV values associated with a PUCCH resource for a PUCCH resource set. The number of repetitions corresponding to a PUCCH resource is provided by the length of the sequence, e.g., nrofSlots is not used. A first PUCCH resource is configured with a list or sequence of SLIV=[67, N/A, 67, 67, 67, 67] where SLIV value=67 indicates the PUCCH symbol allocation beginning on the $3^{rd}$ symbol of a slot and 11 consecutive symbols and where SLIV=N/A indicates an invalid symbol allocation value. The PUCCH repetition is configured for 6 consecutive slots (but 1 slot remains unallocated). A second PUCCH resource is configured with a list or sequence of SLIV=[67, N/A, N/A, N/A, N/A, 67]. The PUCCH repetition is also configured for 6 consecutive slots (but 5 slots remain unallocated). For illustration purposes it is assumed that dl-DataToUL-ACK is configured by RRC with the value 4 for all PUCCH transmissions. Note that different dl-DataToUL-ACK values or the PDSCH-to-HARQ feedback timing indicator field in a DCI may be used in the general case. The UE receives a first DL grant DCI in slot #1, e.g., of type 'D', resulting in the selection of the first PUCCH resource and a first PUCCH transmission of a PUCCH repetition scheduled in slot #5, e.g., the normal UL slot. The UE determines that slot #5, e.g., the normal UL slot is potentially available for PUCCH repetition, but the next slot, e.g., carrying SSBs, is unavailable, then the following 4 slots including the full-duplex slots #2 and #3 are potentially available. The UE transmits the first PUCCH repetition using both the normal UL slot #5 and the full-duplex slots #2 and #3, e.g., over 2 consecutive UL-DL frame configuration periods. After termination of the first PUCCH repetition, the UE receives a second DL grant DCI in DL slot #1 resulting in the selection of the second PUCCH resource. The UE determines that PUCCH transmission of a PUCCH repetition can only occur in the normal UL slots, e.g., slot #5 of the current and the next UL-DL configuration period. The UE therefore transmits the second PUCCH repetition only using the normal UL slots, e.g., slot #5, while not transmitting in the full-duplex slots #2 and #3. Note that the UE determination of UL transmission(s) using the full-duplex slots #2 and #3 of the example provided by FIG. 7 may include additional transmission or reception parameters provided by the PUCCH configuration, such as frequency-domain behavior of a transmission in a full-duplex slot, e.g., start, size and/or end of the SBFD UL subband in the slot or symbol.

When the UE is provided with separate PUCCH configurations associated with different slot or symbol types, i.e., SBFD and non-SBFD slots/symbols or 'D' and 'F' and 'U', respectively, to indicate UE specific or of cell specific PUCCH parameters in a BWP or in a carrier for a cell group of carriers, the UE selects and determines a PUCCH configuration from the PUCCH configurations based on a slot or symbol type to determine the UL transmission parameters.

For example, separate PUCCH configurations associated with SBFD and non-SBFD slots/symbols, respectively, separate PUCCH format configurations, or separate PUCCH resources or PUCCH resources sets for SBFD and non-SBFD slots/symbols, respectively, may be provided or indicated to the UE. Separate values for a same parameter in a PUCCH configuration, in a PUCCH resource or resource set, or in PUCCH format may be provided as information to the UE where a first value of the parameter is indicated for use by the UE in a non-SBFD slots/symbols and a second value of the parameter then is indicated for use by the UE in an SBFD slot/symbol.

After the UE determines the potentially available slots or symbols for PUCCH transmission in a PUCCH transmission using the provided UE-specific RRC configuration with a list or sequence of PUCCH resource allocations in time-domain, the UE determines the available slots for PUCCH transmission in a PUCCH repetition.

The PUCCH transmission procedure for the UE determination of available slots for PUCCH transmission in a PUCCH repetition can then follow other example procedures described herein.

Figure 12:
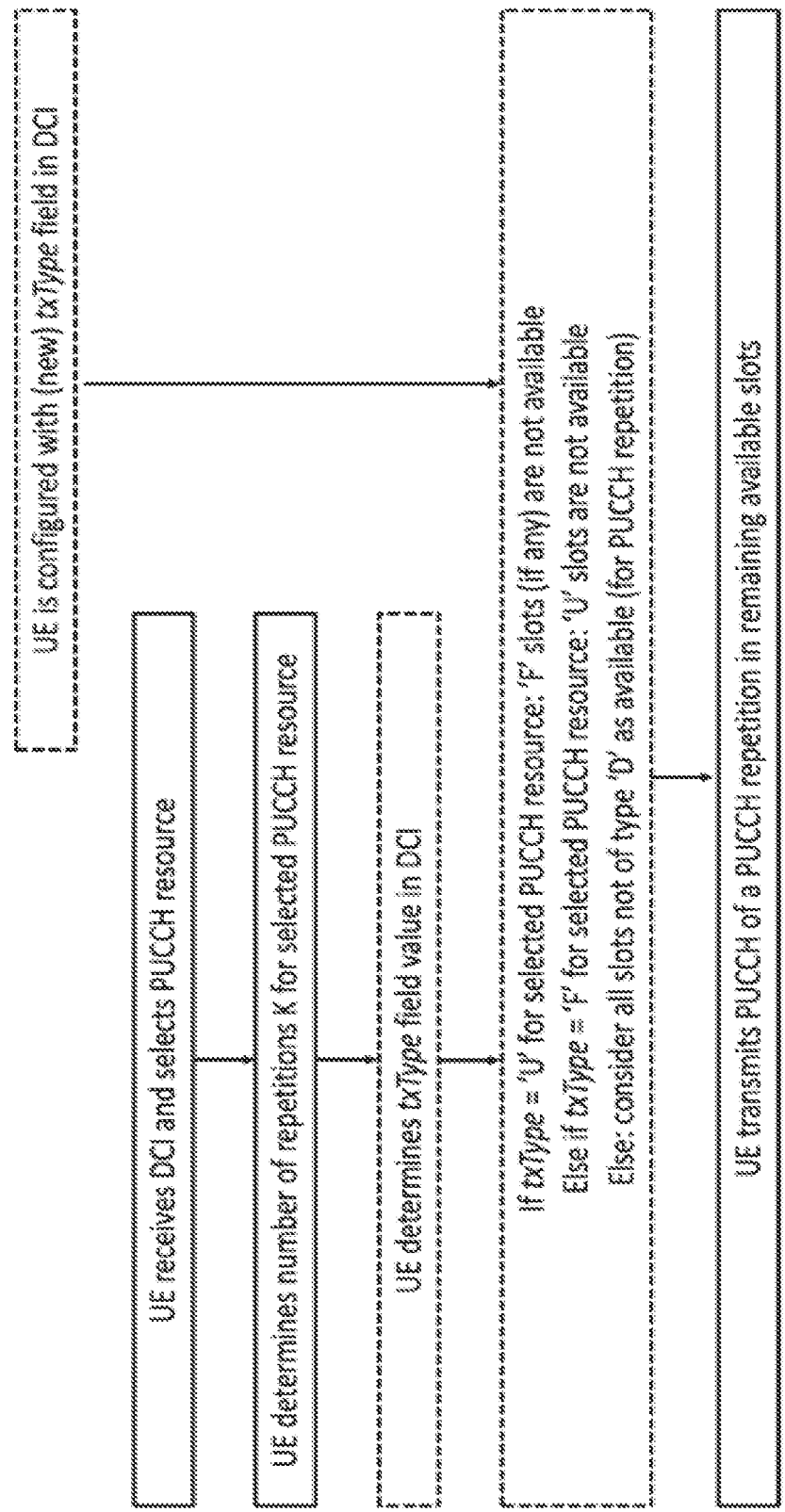
FIG. 12 illustrates flowchart of as example method for an UE determination of available slots for PUCCH repetition using DCI according to embodiments of the disclosure.

FIG. 12 illustrates an example UE determination of available slots for PUCCH repetition using DCI 1200 according to embodiments of the disclosure. The embodiment of the UE determination of available slots for PUCCH repetition using DCI 1200 illustrated in FIG. 12 is for illustration only. FIG. 12 does not limit the scope of this disclosure to any particular implementation of the UE determination of available slots for PUCCH repetition using DCI 1200.

In one embodiment, the UE is provided with an indication of a set of allowed or a set of disallowed slots for PUCCH repetition by L1 control signaling such as DCI.

In one example, the (DL grant) DCI contains the (existing) PUCCH resource indicator (PRI) field, e.g., for purpose of determining the PUCCH resource. An additional new field txType is configured in the DCI. The UE uses the new field txType to determine a set of allowed or a set of disallowed slots for PUCCH transmission. For example, txType can designate a slot or symbol as one or a combination of types 'D', 'U', 'F', or 'N/A' with reference to a time-domain pattern with configurable periodicity for a configuration period, e.g., with reference to slot types 'D', F' or 'U' determined using the TDD UL-DL frame configuration(s) and/or using the SFI. In another example, txType can designate a slot or symbol type 'simultaneous Tx-Rx', 'Rx only', or 'Tx only' with reference to the xdd-config. In another example, txType can designate a slot or symbol with reference to a bitmap or a list of slots or symbols (or groups thereof) indicating if PUCCH repetition is enabled or disabled in the time-domain resources of a PUCCH resource where a bitmap or list of slots may be configured separately by RRC, e.g., using the PUCCH configuration. No setting for txType may be provided or a default behavior may be defined. For example, a PUCCH of a first type, e.g., PUCCH F1 may be allocated to slot type 'Tx-only' or 'U' only, whereas a PUCCH of a second type, e.g., PUCCH F3 may be allocated to slot type 'simultaneous Tx-Rx' or 'both F+U'. Similarly, a same or different txType may be configured with respect to PUCCH resource sets or PUCCH resources.

The new field txType allows for independent control of the time-domain resource allocation associated with the PUCCH transmission in a PUCCH repetition. The UE may be configured by higher layer signaling to use indexing into a (smaller) subset of allowed combinations when determining the PUCCH transmission parameters of a PUCCH repetition. For example, a single bit may be used for txType where a value of 0 is associated with PUCCH transmission of a PUCCH repetition using normal UL slots, e.g., 'Tx only', whereas a value of 1 indicates PUCCH transmissions of a PUCCH repetition in slots of both types 'simultaneous Tx-Rx' and 'Tx-only'.

The example of the single-carrier full-duplex configuration in FIG. 7 is considered. The gNB configures SIB1 tdd-UL-DL-ConfigurationCommon as {dl-UL-TransmissionPeriodicity, nrofDownlinkSlots, nrofDownlinkSymbols, nrofUplinkSlots, nrofUplinkSymbols}={P=2.5 ms, 3 DL slots, 12 DL sym, 0 UL sym, 1 UL slot} or DFFS(D)U. Legacy UEs or UEs not supporting features for enhanced support of (gNB) full-duplex operation determine that any UL transmission(s) when scheduled can only occur in slots #2, #3 and #5. The gNB configures xdd-config with 'Rx-only'-'simultaneous Tx-Rx'-'simultaneous Tx-Rx', 'Rx-only', 'Tx-only' for the UL-DL frame configuration. When the new txType field in the DCI indicates 'simultaneous Tx-Rx', the UE determines that UL transmission of PUCCH in a PUCCH repetition can occur in full-duplex slots #2 and #3. When the new txType field indicates 'Tx-only', the UE determines that UL transmission of PUCCH can only occur in a normal UL slot, e.g., slot #5. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the SBFD UL subband in the slot or symbol.

The example of the single-carrier full-duplex configuration illustrated in FIG. 7 is considered. The gNB configures SIB1 tdd-UL-DL-ConfigurationCommon as DFFSU. Legacy UEs or UEs not supporting features for enhanced support of (gNB) full-duplex operation determine that any UL transmission(s) when scheduled can occur in slots #2, #3 and #5. The gNB configures the txType field in the DCI with length 1. Value 0 indicates default behavior, e.g., PUCCH transmissions of a PUCCH repetition using 'U' slots only. Value 1 indicates PUCCH transmissions of a PUCCH repetition using 'F' slots only, e.g., full-duplex slots. When the new txType field in the DCI indicates 'UL-only', e.g., value 0, the UE determines that UL transmission of PUCCH in a PUCCH repetition can occur in the normal UL slot, e.g., slot #5 subject to a corresponding configuration or indication by dl-DataToUL-ACK or the PDSCH-to-HARQ feedback timing indicator field for the DCI. When the new txType field indicates 'F-only', the UE determines that the PUCCH transmission of a PUCCH repetition can only occur in slots #2 and #3, e.g., the full-duplex slots subject to a corresponding configuration or indication by dl-DataToUL-ACK or the PDSCH-to-HARQ feedback timing indicator field for the DCI. Note that the UE determination of UL transmission(s) using the full-duplex slots #2 and #3 of the example provided by FIG. 7 may include additional transmission or reception parameters provided by xdd-config, such as frequency-domain behavior of a transmission in a full-duplex slot, e.g., start, size and/or end of the SBFD UL subband in the slot or symbol.

When the UE is provided with separate PUCCH configurations associated with different slot or symbol types, i.e., SBFD and non-SBFD slots/symbols or 'D' and 'F' and 'U', respectively, to indicate UE specific or of cell specific PUCCH parameters in a BWP or in a carrier for a cell group of carriers, the UE selects and determines a PUCCH configuration from the PUCCH configurations based on a slot or symbol type to determine the UL transmission parameters.

For example, separate PUCCH configurations associated with SBFD and non-SBFD slots/symbols, respectively, separate PUCCH format configurations, or separate PUCCH resources or PUCCH resources sets for SBFD and non-SBFD slots/symbols, respectively, may be provided or indicated to the UE. Separate values for a same parameter in a PUCCH configuration, in a PUCCH resource or resource set, or in PUCCH format may be provided as information to the UE where a first value of the parameter is indicated for use by the UE in a non-SBFD slots/symbols and a second value of the parameter then is indicated for use by the UE in an SBFD slot/symbol.

After the UE determines the potentially available slots or symbols for PUCCH transmission in a PUCCH transmission using the DCI, the UE determines the available slots for PUCCH transmission in a PUCCH repetition.

The PUCCH transmission procedure for the UE determination of available slots for PUCCH transmission in a PUCCH repetition can then follow the other example procedures described herein.

When common or UE-specific RRC signaling, or a list or sequence of PUCCH resource allocations in time-domain, or DCI-based indication are used to control the UE time-domain transmission behavior of PUCCH transmissions in a PUCCH repetition, the UE is configured or provided with an indication for a set of allowed or a set of disallowed slots in which PUCCH repetition can occur or cannot occur. A UE may support multiple concurrent PUCCH repetition procedures, e.g., in non-overlapping time-domain resources.

In one embodiment, the UE provides a capability indication, for example using RRC signaling, whereby an indication of the support for multiple concurrent PUCCH repetition procedures and/or the number of supported concurrent PUCCH repetition procedures is provided to the network. When concurrent PUCCH repetition procedures for a same UE are supported, the UE receives a signaling indication from the gNB using common or UE-specific RRC signaling if multiple concurrent PUCCH repetition procedures are enabled or disabled. A capability indication provided by the UE to the gNB may indicate if separate PUCCH configurations are supported by the UE for PUCCH transmission using SBFD slots/symbols or non-SBFD slots/symbols, respectively. The UE capability indication provided to the gNB may include a maximum or a minimum number or a range of separate PUCCH configurations which are supported by the UE and associated with SBFD and non-SBFD slots/symbols, respectively. The UE may indicate supported settings, or a maximum or a minimum number or a range of separate PUCCH format configurations, or support for separate PUCCH resources or PUCCH resources sets in SBFD and non-SBFD slots/symbols, respectively, to the gNB. The UE may indicate to the gNB supported value(s) when separate values for a same parameter in a PUCCH configuration, in a PUCCH resource or resource set, or in PUCCH format are supported by the UE.

For example, a UE may indicate to the gNB separate UE capabilities associated with UE support of separate value settings for a same parameter in a PUCCH configuration, in a PUCCH resource or resource set, or in PUCCH format where a first value of the parameter support is indicated by the UE for a non-SBFD slots/symbols and a second value of the parameter support is indicated by the UE for an SBFD slot/symbol. For example, a parameter may correspond to a support for a number of PUCCH resource(s), or a supported PUCCH format, supported values or range for DL data to UL Acknowledgment (ACK) timing or delay, supported number of repetitions, support of DMRS bundling, supported mapping patterns such a cyclic or sequential mapping for PUCCH repetition associated with spatial settings or power control sets, supported frequency-hopping (FH) configuration(s) such as value or range of FH starting PRB or second hop or number of hops or frequency-hopping width(s), supported maximum code rate or number of PRBs for a PUCCH format, or support of simultaneous HARQ acknowledgment and CSI for PUCCH transmission in SBFD slots/symbols or non-SBFD slots/symbols, respectively.

The UE may be configured for a first PUCCH repetition using only the normal UL slot(s) (but not the full-duplex slots) and with a second PUCCH repetition using only the full-duplex slots (but not the normal UL slots). The first PUCCH repetition may be configured with a different or a same number of repetitions than the second PUCCH repetition. The first PUCCH repetition using symbols or slots not allocated for the symbol or slot allocation in the second PUCCH repetition occurs concurrently, e.g., in TDM. A first motivation is increased DL data rate from reduced latency to transmit the Ack/Nack corresponding to the DL TB in the PUCCH. It is undesirable to transmit PUCCH repetition across both full-duplex and normal UL slots because the SBFD UL subband in the center fragments UL scheduling BW in the normal UL slot and greatly reduces UL SE and peak rates in the normal UL slot. When PUCCH repetition is configured to only use the full-duplex slots, assuming DDDSU, then 20% of the (time-domain) UL transmission resources can't be used by the UE for the PUCCH repetition. The use of multiple concurrent PUCCH repetition procedures allows to use only the full-duplex slots for a first PUCCH repetition procedure, and then use a second PUCCH repetition procedure only in the UL slot. The first and the second PUCCH repetition procedure can then use different frequency-domain allocations, e.g., the first PUCCH repetition procedure in the full-duplex slots in the SBFD UL subband does not prevent the second PUCCH repetition procedure in the normal UL slot from being configured at band edges. Fragmentation of UL scheduling BW can be avoided and all time-domain resources are accessible to use by the PUCCH repetitions.

For example, the UE signals its support for and/or the number of supported concurrent PUCCH repetition procedures in non-overlapping time-domain resources using the (UL) UECapabilityInformation message. When concurrent PUCCH repetition procedures are supported by the UE, the UE determines from the PUCCH configuration, e.g., using IEs such as pucch-Config or ServingCellConfig if concurrent PUCCH repetition procedures are enabled and/or the maximum number of concurrent PUCCH repetition procedures. The UE does not expect to be scheduled with PUCCH transmission of a first PUCCH repetition in symbols or slots where PUCCH transmission of a second PUCCH repetition is configured.

As can be seen by someone skilled-in-the-art, solutions and examples described for the case of configuring an allowed set or a disallowed set of time-domain resources for PUCCH repetition using common, UE-specific RRC signaling, a list or sequence of PUCCH resource allocations in time-domain or DCI-based indication based on tdd-UL-DL-ConfigurationCommon and xdd-config, e.g., determination of symbol or slot types 'D', 'F', 'U' are easily extended to the case where tdd-UL-DL-ConfigurationDedicated and/or SFI are provided to the UE. The UE determines a slot and symbol type as described in REF3. For example, the tdd-UL-DL-ConfigurationDedicated if provided only allows to assign symbols or slots of type 'F' in pattern1/patterns2 of tdd-UL-DL-ConfigurationCommon. The UE can determine slot and symbol types in a variety of ways, but for any given slot or symbol determines a single value 'D', 'F', 'U'. Similarly, configuration of slot or symbol types provided by xdd-config uses slot or symbols of types "Tx-only", 'Rx-only', "simultaneous Tx-Rx' for illustration purposes and to simplify exemplary descriptions. Other suitable symbol or slot designations may serve the same purpose as described without loss of functionality.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of operating a user equipment (UE), the method comprising:
  receiving:
    first information for a first set of parameters of a physical uplink control channel (PUCCH) associated with a first subset of slots from a set of slots on a cell, and
    second information for a second set of parameters of the PUCCH associated with a second subset of slots from the set of slots on the cell;
  determining, based on whether a slot is from the first subset of slots or the second subset of slots, a set of PUCCH parameters from the first and second sets of parameters; and
  transmitting, based on the set of PUCCH parameters, the PUCCH in the slot on the cell, wherein:
    slots from the first subset of slots do not include time-domain resources indicated for reception on the cell, and
    slots from the second subset of slots include time-domain resources indicated for transmission or reception on the cell.

2. The method of claim 1, further comprising:
  receiving a physical downlink shared channel (PDCCH) that provides a downlink control information (DCI) format, wherein the DCI format includes a field indicating one of:
    the first subset of slots, or
    the first subset of slots and the second subset of slots;
  determining a number of repetitions for the PUCCH transmission; and
  transmitting, based on the indication by the field, the number of repetitions of the PUCCH in slots of one of:

the first subset of slots, or
the first subset of slots and the second subset of slots.

3. The method of claim 1, further comprising:
receiving a physical downlink shared channel (PDCCH) that provides a downlink control information (DCI) format, wherein:
   the PDCCH is received within a first slot from the set of slots, and
   the DCI format includes a field; and
determining a number of slots based on a mapping of values of the field to numbers of slots, wherein:
   the mapping is indicated based on the first set of parameters when the first slot is from the first subset of slots,
   the mapping is indicated based on the second set of parameters when the first slot is from the second subset of slots, and
   the slot is after the first slot by the number of slots.

4. The method of claim 1, further comprising:
determining a number of repetitions for the PUCCH transmission; and
transmitting:
   a first repetition of the PUCCH in a first slot from the first subset of slots using a first PUCCH resource, and
   a second repetition of the PUCCH in a second slot from the second subset of slots using a second PUCCH resource, wherein:
      the first set of parameters indicate a first set of PUCCH resources,
      the second set of parameters indicate a second set of PUCCH resources,
      the first PUCCH resource is from the first set of PUCCH resources,
      the second PUCCH resource is from the second set of PUCCH resources, and
      the first PUCCH resource and the second PUCCH resource have a same index.

5. The method of claim 1, further comprising:
determining a number of repetitions for the PUCCH transmission; and
transmitting the PUCCH with the number of repetitions, wherein:
   repetitions of the PUCCH in slots from the first subset of slots use a first PUCCH resource,
   repetitions of the PUCCH in slots from the second subset of slots use a second PUCCH resource,
   the number of repetitions is indicated by the first PUCCH resource when an earliest repetition is in a slot from the first subset of slots, and
   the number of repetitions is indicated by the second PUCCH resource when an earliest repetition is in a slot from the second subset of slots.

6. The method of claim 1, further comprising:
determining a first number of resource blocks (RBs) for the PUCCH transmission when the slot is from the first subset of slots, and
determining a second number of RBs for the PUCCH transmission when the slot is from the second subset of slots, wherein:
   the first number of RBs is determined based on a first maximum code rate for information in the PUCCH transmission,
   the second number of RBs is determined based on a second maximum code rate for the information in the PUCCH transmission,
   the first maximum code rate is included in the first set of parameters, and
   the second maximum code rate is included in the second set of parameters, and
wherein transmitting the PUCCH further comprises transmitting the PUCCH:
   over the first number of RBs when the slot is from the first subset of slots, and
   over the second number of RBs when the slot is from the second subset of slots.

7. The method of claim 1, further comprising:
determining whether to transmit the PUCCH in the slot with frequency hopping (FH) based on an indication, wherein the indication is provided by:
   a first value of a first FH parameter from the first set of parameters when the slot is from the first subset of slots, and
   a second value of a second FH parameter from the second set of parameters when the slot is from the second subset of slots,
wherein transmitting the PUCCH further comprises transmitting the PUCCH in the slot based on the determination.

8. A user equipment (UE) comprising:
a transceiver configured to receive:
   first information for a first set of parameters of a physical uplink control channel (PUCCH) associated with a first subset of slots from a set of slots on a cell, and
   second information for a second set of parameters of the PUCCH associated with a second subset of slots from the set of slots on the cell; and
a processor operably coupled to the transceiver, the processor configured to determine, based on whether a slot is from the first subset of slots or the second subset of slots, a set of PUCCH parameters from the first and second sets of parameters,
wherein the transceiver is further configured to transmit, based on the set of PUCCH parameters, the PUCCH in the slot on the cell,
wherein slots from the first subset of slots do not include time-domain resources indicated for reception on the cell, and
wherein slots from the second subset of slots include time-domain resources indicated for transmission or reception on the cell.

9. The UE of claim 8, wherein:
the transceiver is further configured to receive a physical downlink shared channel (PDCCH) that provides a downlink control information (DCI) format, wherein the DCI format includes a field indicating one of:
   the first subset of slots, or
   the first subset of slots and the second subset of slots;
the processor is further configured to determine a number of repetitions for the PUCCH transmission; and
the transceiver is further configured to transmit, based on the indication by the field, the number of repetitions of the PUCCH in slots of one of:
   the first subset of slots, or
   the first subset of slots and the second subset of slots.

10. The UE of claim 8, wherein:
the transceiver is further configured to receive a physical downlink shared channel (PDCCH) that provides a downlink control information (DCI) format,
the PDCCH is received within a first slot from the set of slots,
the DCI format includes a field, the processor is further configured to determine a number of slots based on a mapping of values of the field to numbers of slots,
the mapping is indicated based on the first set of parameters when the first slot is from the first subset of slots,
the mapping is indicated based on the second set of parameters when the first slot is from the second subset of slots, and
the slot is after the first slot by the number of slots.

11. The UE of claim 8, wherein:
the processor is further configured to determine a number of repetitions for the PUCCH transmission,
the transceiver is further configured to transmit:
a first repetition of the PUCCH in a first slot from the first subset of slots using a first PUCCH resource, and
a second repetition of the PUCCH in a second slot from the second subset of slots using a second PUCCH resource,
the first set of parameters indicate a first set of PUCCH resources,
the second set of parameters indicate a second set of PUCCH resources,
the first PUCCH resource is from the first set of PUCCH resources,
the second PUCCH resource is from the second set of PUCCH resources, and
the first PUCCH resource and the second PUCCH resource have a same index.

12. The UE of claim 8, wherein:
the processor is further configured to determine a number of repetitions for the PUCCH transmission,
the transceiver is further configured to transmit the PUCCH with the number of repetitions,
repetitions of the PUCCH in slots from the first subset of slots use a first PUCCH resource,
repetitions of the PUCCH in slots from the second subset of slots use a second PUCCH resource,
the number of repetitions is indicated by the first PUCCH resource when an earliest repetition is in a slot from the first subset of slots, and
the number of repetitions is indicated by the second PUCCH resource when an earliest repetition is in a slot from the second subset of slots.

13. The UE of claim 8, wherein:
the processor is further configured to:
determine a first number of resource blocks (RBs) for the PUCCH transmission when the slot is from the first subset of slots, and
determine a second number of RBs for the PUCCH transmission when the slot is from the second subset of slots;
the first number of RBs is determined based on a first maximum code rate for information in the PUCCH transmission;
the second number of RBs is determined based on a second maximum code rate for the information in the PUCCH transmission;
the first maximum code rate is included in the first set of parameters;
the second maximum code rate is included in the second set of parameters; and
the transceiver is further configured to transmit the PUCCH:
over the first number of RBs when the slot is from the first subset of slots, and
over the second number of RBs when the slot is from the second subset of slots.

14. The UE of claim 8, wherein:
the processor is further configured to determine whether to transmit the PUCCH in the slot with frequency hopping (FH) based on an indication;
the indication is provided by:
a first value of a first FH parameter from the first set of parameters when the slot is from the first subset of slots, and
a second value of a second FH parameter from the second set of parameters when the slot is from the second subset of slots; and
the transceiver is further configured to transmit the PUCCH in the slot based on the determination.

15. A base station (BS) comprising:
a transceiver configured to transmit:
first information for a first set of parameters of a physical uplink control channel (PUCCH) associated with a first subset of slots from a set of slots on a cell, and
second information for a second set of parameters of the PUCCH associated with a second subset of slots from the set of slots on the cell; and
a processor operably coupled to the transceiver, the processor configured to determine, based on whether a slot is from the first subset of slots or the second subset of slots, a set of PUCCH parameters from the first and second sets of parameters,
wherein the transceiver is further configured to receive, based on the set of PUCCH parameters, the PUCCH in the slot on the cell,
wherein slots from the first subset of slots do not include time-domain resources indicated for simultaneous transmissions and receptions on the cell, and
wherein slots from the second subset of slots include time-domain resources indicated for simultaneous transmission and reception on the cell.

16. The BS of claim 15, wherein:
the transceiver is further configured to transmit a physical downlink shared channel (PDCCH) that provides a downlink control information (DCI) format, wherein the DCI format includes a field indicating one of:
the first subset of slots, or
the first subset of slots and the second subset of slots; and
the transceiver is further configured to receive a number of repetitions of the PUCCH in slots of one of:
the first subset of slots, or
the first subset of slots and the second subset of slots.

17. The BS of claim 15, wherein:
the transceiver is further configured to transmit a physical downlink shared channel (PDCCH) that provides a downlink control information (DCI) format,
the PDCCH is transmitted within a first slot from the set of slots,
the DCI format includes a field,
the processor is further configured to determine a number of slots based on a mapping of values of the field to numbers of slots,
the mapping is indicated based on the first set of parameters when the first slot is from the first subset of slots,
the mapping is indicated based on the second set of parameters when the first slot is from the second subset of slots, and
the slot is after the first slot by the number of slots.

18. The BS of claim 15, wherein:
the transceiver is further configured to receive:
- a first repetition of the PUCCH in a first slot from the first subset of slots on a first PUCCH resource, and
- a second repetition of the PUCCH in a second slot from the second subset of slots on a second PUCCH resource, the first set of parameters indicate a first set of PUCCH resources,
the second set of parameters indicate a second set of PUCCH resources,
the first PUCCH resource is from the first set of PUCCH resources,
the second PUCCH resource is from the second set of PUCCH resources, and
the first PUCCH resource and the second PUCCH resource have a same index.

19. The BS of claim 15, wherein:
the transceiver is further configured to receive a number of repetitions of the PUCCH,
repetitions of the PUCCH in slots from the first subset of slots are on a first PUCCH resource,
repetitions of the PUCCH in slots from the second subset of slots are on a second PUCCH resource,
the number of repetitions is indicated by the first PUCCH resource when an earliest repetition is in a slot from the first subset of slots, and
the number of repetitions is indicated by the second PUCCH resource when an earliest repetition is in a slot from the second subset of slots.

20. The BS of claim 15, wherein:
the processor is further configured to:
- determine a first number of resource blocks (RBs) for the PUCCH reception when the slot is from the first subset of slots, and
- determine a second number of RBs for the PUCCH reception when the slot is from the second subset of slots;

the first number of RBs is determined based on a first maximum code rate for information in the PUCCH reception;
the second number of RBs is determined based on a second maximum code rate for the information in the PUCCH reception;
the first maximum code rate is included in the first set of parameters;
the second maximum code rate is included in the second set of parameters; and
the transceiver is further configured to receive the PUCCH:
- over the first number of RBs when the slot is from the first subset of slots, and
- over the second number of RBs when the slot is from the second subset of slots.

* * * * *